US012760712B2

(12) United States Patent
Xue et al.

(10) Patent No.: US 12,760,712 B2
(45) Date of Patent: Oct. 13, 2026

(54) LOAD SENSOR CALIBRATION METHOD AND APPARATUS, AND COMPUTER-READABLE STORAGE MEDIUM

(71) Applicant: Xinjiang Goldwind Science & Technology Co., Ltd., Urumqi (CN)

(72) Inventors: Da Xue, Beijing (CN); Wenlei Zhang, Beijing (CN); Lei Liu, Beijing (CN)

(73) Assignee: GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 114 days.

(21) Appl. No.: 18/260,234

(22) PCT Filed: Jun. 10, 2021

(86) PCT No.: PCT/CN2021/099413
§ 371 (c)(1),
(2) Date: Jun. 30, 2023

(87) PCT Pub. No.: WO2022/142149
PCT Pub. Date: Jul. 7, 2022

(65) Prior Publication Data

US 2024/0068449 A1 Feb. 29, 2024

(30) Foreign Application Priority Data

Dec. 31, 2020 (CN) ........................ 202011634703.1

(51) Int. Cl.
*F03D 17/00* (2016.01)

(52) U.S. Cl.
CPC .......... *F03D 17/025* (2023.08); *F03D 17/011* (2023.08)

(58) Field of Classification Search
CPC ............................ F03D 17/025; F03D 17/011
See application file for complete search history.

(56) References Cited

U.S. PATENT DOCUMENTS 9,353,727 B2 * 5/2016 Slot ........................ F03D 1/065
10,054,510 B2 8/2018 Baba et al.
(Continued)

FOREIGN PATENT DOCUMENTS

CN 103206342 A 7/2013
CN 104318070 A 1/2015
(Continued)

OTHER PUBLICATIONS

Robbie Allen, A Gentle Introduction to Machine Learning Concepts, Published in Machine Learning in Practice • Feb. 12, 2020 (Year: 2020).*
(Continued)

*Primary Examiner* — Kyle R Quigley
(74) *Attorney, Agent, or Firm* — Bayes PLLC

(57) ABSTRACT

A load sensor calibration method and apparatus, and a computer-readable storage medium are provided. The load sensor calibration method includes: acquiring operation data of a wind turbine generator set, wherein the operation data comprises data of the wind turbine generator set operating in a normal operating state or data of the wind turbine generator set operating under different predetermined pitch angle idling states; generating a calibration training set on the basis of the operation data; and calibrating a load sensor according to the calibration training set.

18 Claims, 26 Drawing Sheets

(56) References Cited

U.S. PATENT DOCUMENTS

| | | | | |
|---|---|---|---|---|
| 10,612,524 | B2 * | 4/2020 | Caponetti | G01L 5/12 |
| 10,677,225 | B2 * | 6/2020 | Caponetti | F03D 7/0224 |
| 2009/0180875 | A1 | 7/2009 | Egedal et al. | |
| 2011/0049888 | A1 | 3/2011 | Nakayama | |
| 2012/0035865 | A1 * | 2/2012 | Fujioka | F03D 17/00 702/42 |
| 2012/0292905 | A1 * | 11/2012 | Slot | F03D 1/065 290/55 |
| 2013/0183151 | A1 * | 7/2013 | Garate Lvaro | F03D 17/00 416/31 |
| 2017/0074743 | A1 * | 3/2017 | Baba | G01M 5/00 |
| 2017/0292501 | A1 * | 10/2017 | Perley | F03D 17/00 |
| 2020/0300227 | A1 * | 9/2020 | Evans | F03D 17/00 |
| 2021/0190041 | A1 * | 6/2021 | Duarte Pereira | F03D 7/046 |
| 2022/0074386 | A1 * | 3/2022 | Nielsen | F03D 7/0224 |
| 2023/0265832 | A1 * | 8/2023 | Kang | F03D 7/042 290/44 |

FOREIGN PATENT DOCUMENTS

| | | | |
|---|---|---|---|
| CN | 106815771 | A | 6/2017 |
| CN | 107701379 | A | 2/2018 |
| CN | 108267264 | A | 7/2018 |
| CN | 108468622 | A | 8/2018 |
| CN | 110761957 | A | 2/2020 |
| CN | 111287911 | A | 6/2020 |
| JP | 4959814 | B2 | 6/2012 |
| WO | 2020125885 | A1 | 6/2020 |

OTHER PUBLICATIONS

International Search Report in related PCT Application No. PCT/CN2021/099413 dated Sep. 28, 2021 (11 pages).

Guoqing Li et al., Research on the Blade Mechanical Load Calibration Method, China Academic Journal Electronic Publishing House (2013) (5 pages).

Extended European Search Report in related European Application No. 21912908.7 dated Jun. 6, 2024 (9 pages).

Office Action in related Chinese Application No. 202011634703.1 dated Dec. 5, 2022 (14 pages).

Office Action in related Australian Application No. 2021415070 dated May 30, 2024 (4 pages).

* cited by examiner

LOAD SENSOR CALIBRATION METHOD AND APPARATUS, AND COMPUTER-READABLE STORAGE MEDIUM

CROSS-REFERENCE TO RELATED APPLICATIONS

This application is the national phase of International Application No. PCT/CN2021/099413, filed on Jun. 10, 2021, which claims the priority to Chinese Patent Application No. 202011634703.1, filed on Dec. 31, 2020. The entire contents of each of the above-identified applications are expressly incorporated herein by reference.

TECHNICAL FIELD

The present disclosure generally relates to the technical field of wind power generation, and in particular to a method and a device for calibrating a load sensor, a computer-readable storage device.

BACKGROUND

A conventional method for calibrating a load sensor is semi-auto calibration by locking impellers in conjunction with reciprocating a pitch. Three blades are rotated in turn to be vertically downward and the impeller is locked at such attitude. After the impeller is lock, a blade in a direction of 2 o'clock and a blade in a direction of 10 o'clock are subjected to reciprocating pitch in a range of 0 to 90 degrees. A pitch angle of the blade and a measurement wavelength of a fiber optic load sensor at a blade root are collected throughout the process. Data analysis and calibration of a sensor parameter are then performed.

In the above-mentioned method, the wind turbine needs to be shut down, which affects a normal operation of the set and results in a loss of power generation. Execution of the method requires on-site personnel to arrive at an engine room and operate to lock the impellers. To ensure data validity, it is necessary to operate for a complete cycle under a suitable wind condition. The operation is easy to be interrupted due to sudden changes in wind and therefore needs to be repeated. A complete cycle generally takes more than 60 minutes, which is a complex process and has a low efficiency.

SUMMARY

Embodiments of the present disclosure provide a method and a device for calibrating a load sensor, and a computer-readable storage medium, which can effectively solve the problems of power generation loss and high labor cost caused by manual operations, such as shutdown and impeller locking of a wind turbine, in the conventional method.

In a general aspect, a method for calibrating a load sensor is provided. The method includes: obtaining operation data of a wind turbine, wherein the operation data comprises data of the wind turbine operating in a normal state or data of the wind turbine operating in different idle states at different predetermined pitch angles; generating, based on the operation data, a training set for calibration; and calibrating the load sensor based on the training set for calibration.

In another general aspect, a device for calibrating a load sensor is provided. The device includes: an obtaining module, configured to obtain operation data of a wind turbine, wherein the operation data comprises data of the wind turbine operating in a normal state or data of the wind turbine operating in different idle states at different predetermined pitch angles; a generation module, configured to generate, based on the operation data, a training set for calibration; and a calibration module, configured to calibrate the load sensor based on the training set for calibration.

In another general aspect, a computer-readable storage medium storing instructions is provided. The instructions, when executed by at least one computing device, cause the at least one computing device to perform the method as mentioned above.

In another general aspect, a system is provided, including at least one computing device and at least one storage device storing instructions. The instructions, when executed by at least one computing device, cause the at least one computing device to perform the method as mentioned above.

With the method and device for calibrating a load sensor, and the computer-readable storage medium according to the embodiments of the present disclosure, data of the wind turbine operating in the normal state or data of the wind turbine operating in an idle state under two predetermined pitch angles are obtained; and the load sensor is calibrated based on the data of the wind turbine operating in the normal state or the data of the wind turbine operating in an idle state under two predetermined pitch angles. There is no need for shutting down, locking impellers, and other manual operations on the wind turbine. Therefore, application of the method minimizes an intervention in the calibration process to the wind turbine, so that a loss of power generation caused by calibration of the sensor is avoided and a labor cost is saved. Therefore, the problems of power generation loss and high labor cost caused by manual operations, such as shutdown and impeller locking of a wind turbine, in the conventional method are solved by the embodiments of the present disclosure.

Additional aspects and/or advantages of the disclosed overall concept are partially explained in the following description. The other parts of the present disclosure will be clear through the description or can be learned through implementations of the overall concept of the present disclosure.

BRIEF DESCRIPTION OF DRAWINGS

The above and other objectives and features of embodiments of the present disclosure become more apparent from the following description in conjunction with the drawings that exemplarily illustrate the embodiments. In the drawings.

DETAILED DESCRIPTION

Figure 1:
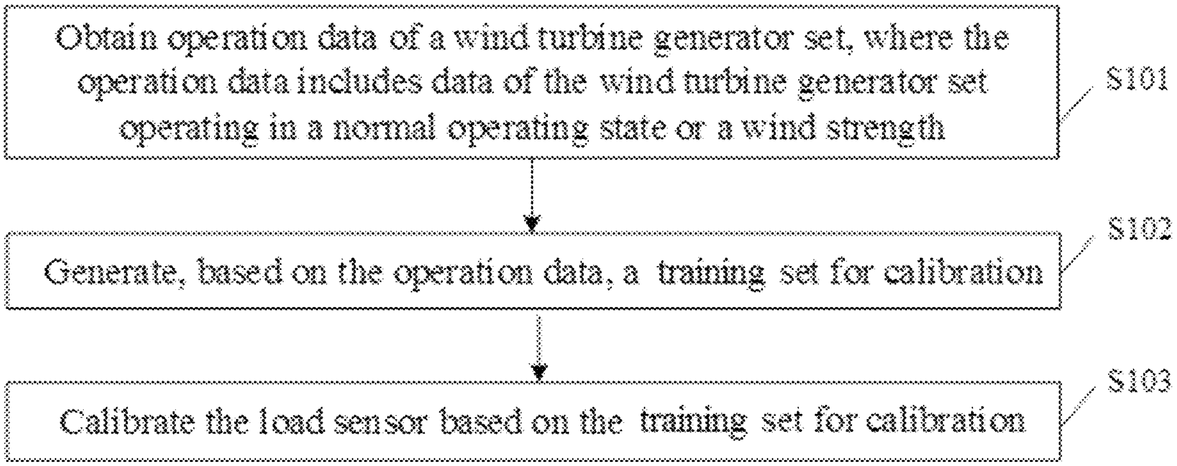
FIG. 1 is a flowchart illustrating a method for calibrating a load sensor according to an embodiment of the present disclosure.

Specific embodiments are provided below to help readers to gain a comprehensive understanding of the method, device, and/or system described here. However, after understanding the present disclosure, various changes, modifications, and equivalents of the method, device, and/or system described herein would be clear. For example, an order of operations described herein is only an example and is not limited to those described here, but may be changed as would be clear after understanding the present disclosure, except for operations that must occur in a specific order. In addition, description of features known in the art may be omitted, for clarity and conciseness.

The features described herein may be implemented in different forms and should not be limited to the examples described here. On the contrary, the examples described here are provided to illustrate only some of feasible ways of implementing the method, device, and/or system described here, many other feasible ways would be clear after understanding the present disclosure.

As used herein, terms "and/or" includes any one of listed items associated with the term, and any combination of any two or more of the items.

Although terms "first," "second," "third" and the like may be used herein to describe various components, elements, regions, layers, or parts, these components; elements, regions, layers, or parts should not be limited by these terms. On the contrary, these terms are only used to distinguish one component, element, region, layer, or part from another component, component, region, layer, or part. Therefore, without departing from the teachings of the examples, a first component, first element, first region, first layer, or first part referred to in the examples described herein may also be referred to as a second component, second element, second region, second layer, or second part.

In the specification, when a component (such as a layer, region, or substrate) is described as "on", "connected to", or "bonded to" another component, the component may be directly "on", "connected to", or "bonded to" another component, or there may be one or more other components between the two components. On the contrary, when a component is described as "directly on" another component, "directly connected to" or "directly bonded to" another component, there may be no other components between the two components.

The terms used herein are only for describing various examples and are not intended to limit the present disclosure. Unless clearly indicated in the context otherwise, a singular form is also intended to include a plural form. Terms "include", "comprise", and "have" indicate existence of a mentioned feature, quantity, operation, component, element, and/or combination thereof, but do not exclude existence or addition of one or more other features, quantities, operations, components, elements, and/or combinations thereof.

Unless otherwise defined, all terms used herein (including technical terms and scientific terms) have the same meanings as those commonly understood by ordinary technical personnel in the field to which the present disclosure belongs after understanding the present disclosure. Unless explicitly defined otherwise, terms (such as those defined in a general dictionary) should be interpreted as having meanings consistent with their respective contexts in the relevant field and in the present disclosure, and should not be interpreted ideally or too formally.

In addition, in the description of the examples, detail description of well-known relevant structures, or functions are omitted, when it is believed that the detailed description may lead to ambiguity of the present disclosure.

In the conventional method for calibrating a load sensor, the wind turbine needs to be shut down, which affects a normal operation of the set and results in a loss of power generation. Execution of the method requires on-site personnel to arrive at an engine room and operate to lock the impellers. To ensure data validity, it is necessary to operate for a complete cycle under a suitable wind condition. The operation is easy to be interrupted due to sudden changes in wind and therefore needs to be repeated. A complete cycle generally takes more than 60 minutes, which is a complex process and has a low efficiency. In addition, a variation of an azimuth angle of an impeller in data collected through this calibration scheme is limited, and an accuracy of an obtained calibration result cannot reach an optimal level. Moreover, a model of a load sensor at a blade root needs to match a coefficient of thermal expansion of a material of the blade. Operation data of the generator set shows that a load measured by the sensor drifts to a certain extent with changes in environmental temperature, in a case that a temperature coefficient is mismatched, so that an application of measurement results is influenced, and a calibration result has limited adaptability to environment.

To solve the above problems, the present disclosure provides a method and a device for calibrating a load sensor, and a computer-readable storage medium, which can solve the above problems. The method for calibrating a load sensor calibration according to the present disclosure may be applied to a standalone controller (a controller of a wind turbine power generator set), a field-level controller (a controller of a wind power plant), a computer device, and the like. The computer device refers to a device having capabilities of data calculation, processing and storage. The computer device may be, for example, a PC (Personal Computer) or a server. The computer device may be in a quantity of one or more. The computer device may be connected to the controller of a wind turbine or the controller of a wind power plant through wired or wireless connection, which is not limited here. Alternatively, the server may be a single server, a cluster of servers, a cloud computing platform, or a virtualization center.

A situation where the method is applied to the standalone controller, i.e., the controller of a wind turbine, is described. The controller of the wind turbine may obtain data of the wind turbine operating in a normal state or data of the wind turbine operating in an idle state under different predetermined pitch angles. The controller of the wind turbine calibrates the load sensor based on the obtained data, to obtain a calibration result. The calibration result may include an updated parameter of the load sensor. Then, the controller of the wind turbine may be applied for subsequent control and protection of the generator set based on the updated parameter of the load sensor.

A situation where the method is applied to the field-level controller, i.e., the controller of the wind power plant, is described. A controller of the wind turbine obtains data of the wind turbine operating in a normal state or data of the wind turbine operating in an idle state under different predetermined pitch angles, and transmits, through wired or wireless transmission, the obtained data to the controller of the wind power plant where the wind turbine is located. The controller of the wind power plant may calibrate the load sensor based on the obtained data, to obtain a calibration result, and transmit the calibration result to the controller of the wind turbine through wired or wireless communication. The calibration result may include an updated parameter of the load sensor. Then, the controller of the wind turbine may be applied for subsequent control and protection of the generator set based on the updated parameter of the load sensor.

A situation where the method is applied to a computer device is described. The computer device may be connected to a controller of a wind turbine through wired or wireless connection. The Computer device may obtain data of the wind turbine operating in a normal state or data of the wind turbine operating in an idle state under different predetermined pitch angles. Based on the obtained data, the computer device calibrates the load sensor to obtain a calibration result, and transmits the calibration result to the controller of the wind turbine through wired or wireless communication. The calibration result may include an updated parameter of the load sensor. Then, the controller of the wind turbine may be applied for subsequent control and protection of the generator set based on the updated parameter of the load sensor.

With the method in the present disclosure, there is no need for shutting down, locking impellers, and other manual operations on the wind turbine. Therefore, application of the method minimizes an intervention in the calibration process to the wind turbine, so that a loss of power generation caused by calibration of the sensor is avoided and a labor cost is saved.

Embodiments of the present disclosure are described in detail in conjunction with the accompanying drawing by taking an example of application to a computer device.

A method for calibrating a load sensor is provided in the present disclosure. FIG. 1 is a flowchart illustrating a method for calibrating a load sensor according to an embodiment of the present disclosure. As shown in FIG. 1, the method includes the following steps S101 to S103.

In step S101, operation data of a wind turbine is obtained.

In an example, a controller of the wind turbine obtains the operation data of the wind turbine continuously during a predetermined time period, and transmits the operation data to a computer device through a wireless network. In another example, the controller of the wind turbine obtains the operation data of the wind turbine at equal intervals within a predetermined time period and transmits the operation data to a computer device through a wireless network.

The operation data refers to various data that may be detected during operation of the wind turbine, including data of the wind turbine operating in a normal state or data of the wind turbine operating in an idle state under different predetermined pitch angles. For example, the operation data may include, but is not limited to: a) pitch angle of each blade; b) an azimuth angle of an impeller; c) a wind speed; d) a rotation speed of an impeller; e) a left or right yaw; f) a yaw deviation from wind; g) an operation mode word (standby, startup, operating, shutdown, and the like) of the generator set; and h) a wavelength measured by the load sensor. The “wind speed” variable may be an instantaneous wind speed, or an average wind speed in 3 seconds or 10 seconds, and does not make a significant impact on a calibration result. To ensure sufficient data volume for calibration, collection of the operation data may be performed for one to three days under a low wind speed.

The pitch angle refers to an angle over a pitch. The idle state refers to a state in which the wind turbine rotates slowly but does not generate electricity when all functions are normal.

After the operation data of the wind turbine is obtained through step S101, a training set for calibration is generated based on the operation data (step S102). For example, after obtaining the operation data of the wind turbine, the computer device may generate, based on the operation data, a training set for calibration in the following way.

Methods for generating the training set for calibration include, but are not limited to, the following two methods. A first method corresponds to the normal state of the wind turbine. After the operation data of the generator set in the normal state is obtained, the operation data is first preprocessed (for example, validity screening is performed on the data). Then, the preprocessed operation data is grouped by a pitch angle. Random sampling and azimuth-based distribution are then performed on each group of operation data, to obtain a training sub-set for calibration corresponding to the group. Training sub-sets for calibration are merged to obtain the training set for calibration.

A second method corresponds to the idle state of the wind turbine at different predetermined pitch angles. By obtaining the operation data of the generator set in the idle state under different predetermined pitch angles, the operation data of the generator set in the idle state under different predetermined pitch angles can be obtained. The operation data of the generator set in the idle state under all predetermined pitch angles is merged, to obtain a training set for calibration.

Explanation for the two methods for generating the training set for calibration is provided below.

The first method is to generate the training set for calibration based on the operation data of the wind turbine under the normal state. In this case, the method includes the following steps.

In step 1, the operation data is filtered based on a preset filtering condition, to obtain a first dataset.

After the operation data of wind turbine under the normal state is obtained, data filtering may be performed based on a preset filtering condition. Data that meets the filtering condition are retained, so as to obtain filtered operation data, which is the above-mentioned first dataset.

The preset filtering condition includes, but is not limited to: a pitch angle being in a range of [30 degrees, 90 degrees], by which a calibration error is prevented from being introduced at a minimum pitch angle due to an aerodynamic factor; a wind speed<=5 meters per second, by which an influence of the aerodynamic factor on a theoretical load is ensured not exceeding 10%; a rotation speed of an impeller being less than 1 rpm, by which a calibration error is prevented from being introduced due to an aerodynamic factor at a high rotation speed; a left-right yaw being in a state of no action, by which an aerodynamic load on a blades introduced due to the yaw is prevented; a deviation to wind of a yaw being less than 20 degrees, by which an aerodynamic load introduced due to an excessive deviation to wind is prevented; an operating state word (i.e., a state flag bit) being 3 or 4, by which it is ensured that a sufficient pitch angle range is introduced without active pitching.

It should be noted that the above data filtering conditions may be met simultaneously, or necessary ones of the conditions are selected as needed. Through the filtering, the operating state of the generator set is ensured to be suitable for the calibration of the load sensor. In addition, an online power and other variables may be further considered as auxiliary filtering conditions, in order to ensure accurate recording of the operation data of the generator set.

In step 2, the first dataset is divided into a set for pitch angles at idle and a set for pitch angles not at idle based on pitch angles in the first dataset.

The set for pitch angles at idle includes operation data in the first dataset except for the pitch angle at idle.

After the filtered operation data, or, the first dataset, is obtained, it is necessary to divide valid data after the filtering into two sets based on the pitch angle, i.e., the set for pitch angles at idle and the set for pitch angles not at idle, in order to obtain training data for calibration that is more balanced in terms of pitch angle (which means that operation data volume corresponding to a pitch angle at idle is not significantly different from operation data volume corresponding to a pitch angle not at idle). This is because that there is usually a large volume of data of the pitch angle at idle in the filtered data, while the volume of data of the non-pitch angle of the generator set in other states is relatively limited. Specific method may include: obtaining a pitch angle of predetermined operation data in the first dataset, determining whether the pitch angle is a pitch angle at idle; classifying the predetermined operation data corresponding to the pitch angle into the set for pitch angles at idle, in a case that the pitch angle is a pitch angle at idle; classifying the predetermined operation data corresponding to the pitch angle into the set for pitch angles not at idle, in a case that the pitch angle is not a pitch angle at idle; performing the classification on the operation data in the first dataset in sequence until all of the operation data are classified into the set for pitch angles at idle and the set for a non-pitch angle.

In step 3: random sampling is performed on operation data from the set for pitch angles at idle and operation data from the set for pitch angles not at idle, respectively, to obtain data points, and a training set for calibration is generated based on azimuth angles in the data point.

The data point refers to data at a time instant in a time domain of the operation data, and includes data obtained at that time, such as all of operation data corresponding to the azimuth angle at that time instant.

The azimuth (angle), also known as a horizon accuracy, is one of methods for measuring an angle difference between objects on a plane. The azimuth is a horizontal angle from a north direction of a certain point to a target direction in a clockwise direction.

After the set for pitch angles at idle and the set for pitch angles not at idle are obtained, random sampling is performed on the set for pitch angles at idle and a set for pitch angles not at idle, respectively, to obtain a data point. Based on a size of the azimuth angle in a data point, the data point is assigned to a corresponding azimuth sector. Then, a next data point is randomly selected. The above processing steps are repeated until the quantity of data points in all azimuth bins reaches a predetermined quantity. The predetermined quantity may be set based on an actual situation. Then, data points in all the azimuth bins are merged to obtain the training set for calibration.

According to an embodiment of the present disclosure, the step of performing random sampling on operation data in the set for pitch angles at idle and operation data on operation data in the set for pitch angles not at idle, respectively, to obtain data points, and generating the training set for calibration based on azimuth angles in the data points may be achieved by: obtaining the data points from the set for pitch angles at idle and a set for pitch angles not at idle through the random sampling; distributing the operation data into corresponding azimuth bins, based on azimuth angles in the data points, until a quantity of the operation data in each of the azimuth bins reaches a predetermined value; and merging operation data from all the azimuth bins to generate the training set for calibration.

Each of the azimuth bins is a storage area corresponding to an angle interval of angle intervals determined by evenly dividing 360 degrees, where each azimuth bin covers a first predetermined angle. Each angle interval corresponds to two azimuth bins, and the two azimuth bins corresponding to the set for pitch angles at idle and the set for pitch angles not at idle. The predetermined angle may be set to 30 degrees or other angles.

Through this step, adoption of the random sampling can ensure that each data point in the set for pitch angles at idle and the set for pitch angles not at idle has a chance to be extracted. The uniformity of distribution based on azimuth angles helps to improve an accuracy and stability of a calibration result. That is, by using the azimuth-based distribution for generating the training set for calibration, a balance of data among the azimuth intervals is ensured.

An example of the first method of generating a training set for calibration is described below with reference to FIG. 2 and FIG. 3.

Figure 2:
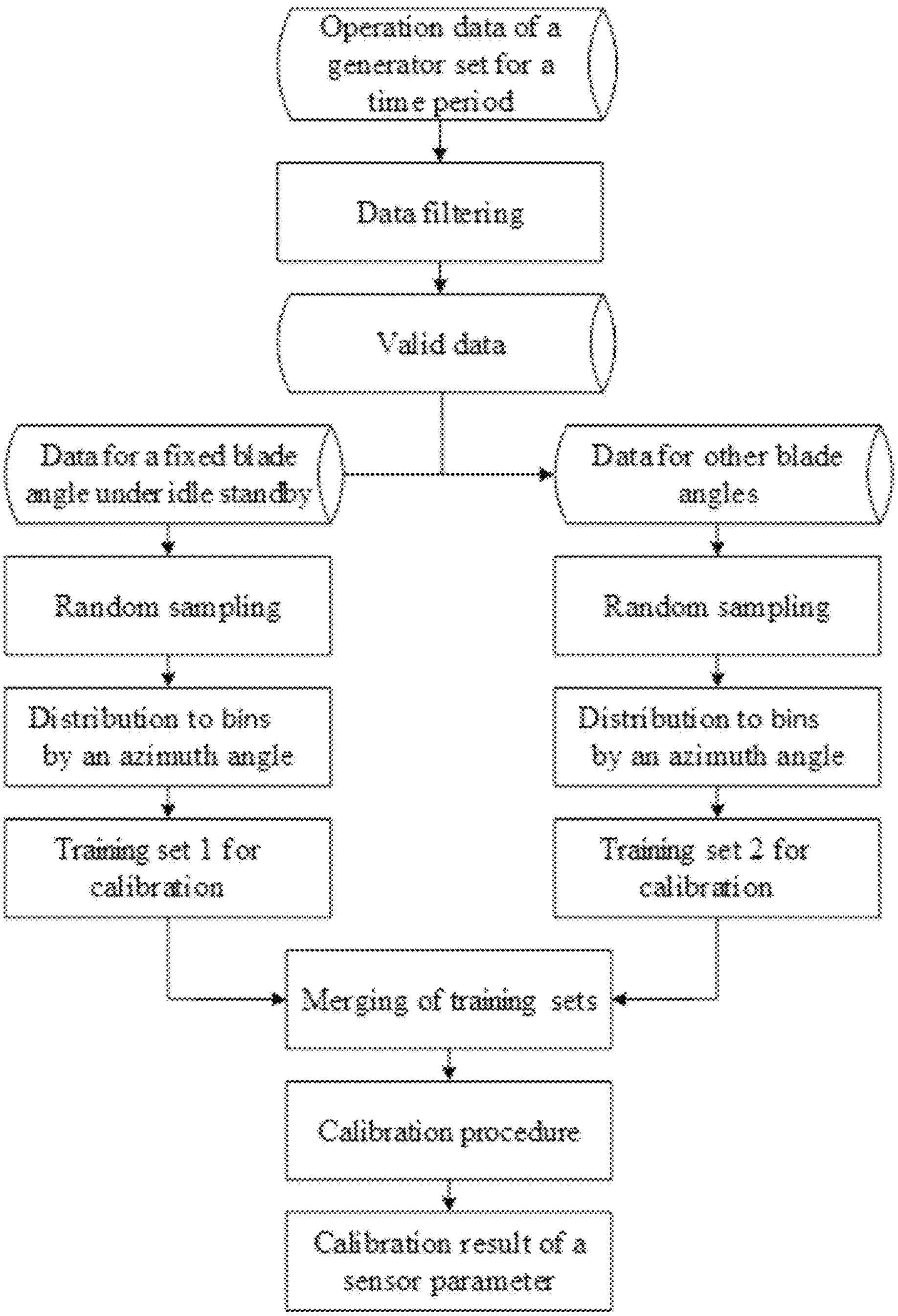
FIG. 2 is a flowchart illustrating a method for calibrating a load sensor according to another embodiment of the present disclosure.

FIG. 2 is a flowchart illustrating a method for calibrating a load sensor according to another embodiment of the present disclosure. As shown in FIG. 2, the method is a process for auto calibration of a load sensor based on conventional operation data of a generator set. A process of generating a training set for calibration includes the following steps.

In step 1, operation data of the generator set in a normal state for a time period is obtained.

In step 2, the operation data of the generator set is filtered to obtain valid data, in order to ensure an accuracy of calibration. A specific filtering condition may be as described above, and is not discussed further here.

In step 3, the obtained valid data is divided into a set for pitch angles at idle and a set for pitch angles not at idle.

Generally, there is a large volume of data of the pitch angle at idle in the obtained filtered data (generator set having different models have different preset pitch angles in an idle state, such as 50 degrees, 60 degrees, and the like), while the volume of data of the pitch angle not at idle is relatively limited. In order to obtain training data forcalibration that is balanced in the variable of pitch angle (which means that a volume of operation data corresponding to a pitch angle at idle is not significantly different from a volume of operation data corresponding to a pitch angle not at idle), it is necessary to divide valid data after the filtering into two sets based on the pitch angle, i.e., the set for pitch angles at idle and the set for pitch angles not at idle.

In step 4, random sampling and azimuth-based distribution are performed on the set for pitch angles at idle and a set for pitch angles not at idle, to obtain two training sets for calibration. The two training sets for calibration are merged to obtain a final training set for calibration. In this way, a richness of the pitch angle in the final training set for calibration is ensured.

In the random sampling and azimuth-based distribution, it is considered that a balance of accuracy and computational complexity of a calibration result of a sensor is realized in a case that the volume of data in each azimuth bin reaches 50.

Figure 3:
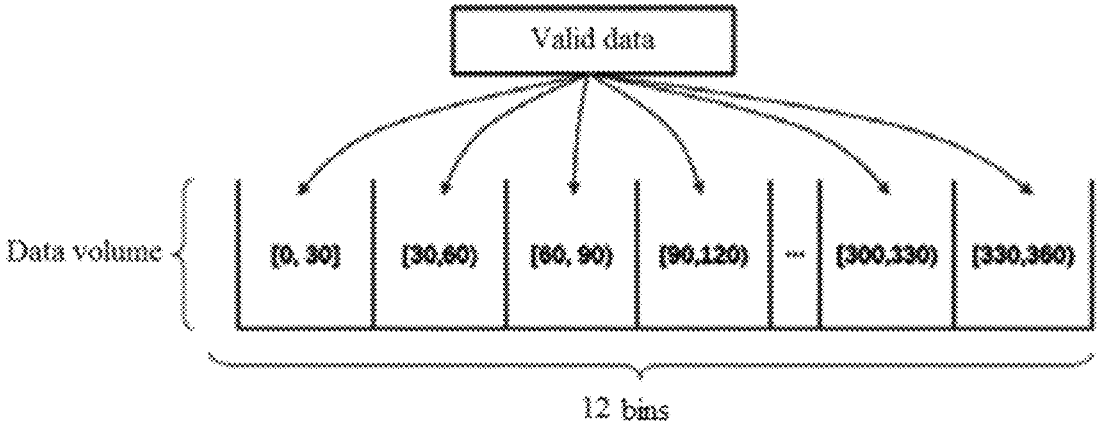
FIG. 3 is a schematic diagram showing an azimuth-based distribution according to an embodiment of the present disclosure.

FIG. 3 is a schematic diagram showing an azimuth-based distribution according to an embodiment of the present disclosure. In combination with the storing method as FIG. 3, the random sampling is specifically performed through the following steps 1 to 4.

In step 1, a data point at a time instant is randomly selected from "data of pitch angles at idle (i.e., the set of pitch angles at idle as mentioned above)" or "data of pitch angles not at idle (i.e., the set of pitch angles not at idle as mentioned above)".

In step 2, the data point extracted in step 1 is stored into a corresponding azimuth bin based on an azimuth angle of the data point, and a data volume of the azimuth in the azimuth bin is recorded.

In step 3, a randomly selected data point is discarded in a case that the data volume in the azimuth bin reaches an upper limit (i.e., the predetermined value as mentioned above), that is, $n_{data}$=50.

In step 4, step 1 to step 3 are repeated, until a quantity of the operation data in each of the azimuth bins reaches 50. Data from all azimuth bins is merged to obtain the training set for calibration.

It should be noted that in a case that an azimuth sensor of the generator set is an inclination sensor, and there is a periodic mutation at zero crossing, data within a 30 degree range of the azimuth at zero crossing in the training set for calibration needs to be removed, in order to ensure accurate calculation of a theoretical load.

It should be noted that the operation data of the generator set includes at least the following variables: a) a pitch angle of three blades; b) an azimuth of an impeller; c) a wind speed; d) a rotation speed of an impeller; e) a left-right yaw; f) a yaw deviation from wind; g) an operation mode word (standby, startup, operating, shutdown, and the like) of the generator set; and h) a wavelength measured by the load sensor. The "wind speed" variable may be an instantaneous wind speed, or an average wind speed in 3 seconds or 10 seconds, and does not make a significant impact on a calibration result. To ensure sufficient data volume for calibration, collection of the operation data may be performed for one to three days under a low wind speed.

According to an embodiment of the present disclosure, the process of obtaining and filtering of the operation data may be performed by: obtaining operation data of the wind turbine at equal intervals within a predetermined time period, and filtering the operation data obtained at each interval according to preset filtering conditions. This embodiment provides a method for obtaining and filtering operation data of a wind turbine, which provides optional options for the process of obtaining and filtering the operation data.

In a second method, a training set for calibration is generated based on the operation data of the wind turbine generator operating in and idle state under different predetermined pitch angles. In this case, the method may include steps 1 to 2 as follows.

In step 1, operation data of the wind turbine operating in the idle state under different predetermined pitch angles is obtained, that is, operation data while the generator set is idling under different predetermined pitch angles is collected. Here, the different predetermined pitch angles may include two pitch angles different from each other, which may be referred to, for example, a first predetermined pitch angle and a second predetermined pitch angle, respectively.

In an embodiment of the present disclosure, first idle data is obtained, including operation data of the wind turbine idling under a first predetermined pitch angle for at least three cycles; and second idle data is obtained, including operation data of the wind turbine idling under a second predetermined pitch angle for at least three cycles. The first idle data includes but is not limited to the operation data of the wind turbine idling under the first predetermined pitch angle for at least three cycles, and may further include any data required in an actual situation. Similarly, the second idle data includes but is not limited to the operation data of the wind turbine idling under the first predetermined pitch angle for at least three cycles, and may further include any data required in an actual situation.

For example, two different predetermined pitch angles are determined. Then, the wind turbine is controlled to idle for at least three cycles at the first predetermined pitch angle, and operation data of the wind turbine during this operation period is obtained. Then, the wind turbine is controlled to idle for at least three cycles at the second predetermined pitch angle, and operation data of the wind turbine during this operation period is obtained.

The first predetermined pitch angle and the second predetermined pitch angle are greater than or equal to a second predetermined angle, and an angle difference between the first predetermined pitch angle and the second predetermined pitch angle is greater than a third predetermined angle. Specifically, the second predetermined angle may be set to 30 degrees. Theoretically, a larger third predetermined angle is more conducive to calibration accuracy. Specific settings may be set based on an actual situation and historical experience.

In step 2, the obtained operation data of the wind turbine idling under two pitch angles is merged as a training set for calibration. That is, the first idle data and the second idle data obtained in step 1 are merged to obtain the training set for calibration.

An example of the second method of generating a training set for calibration is described with reference to FIG. 4.

Figure 4:
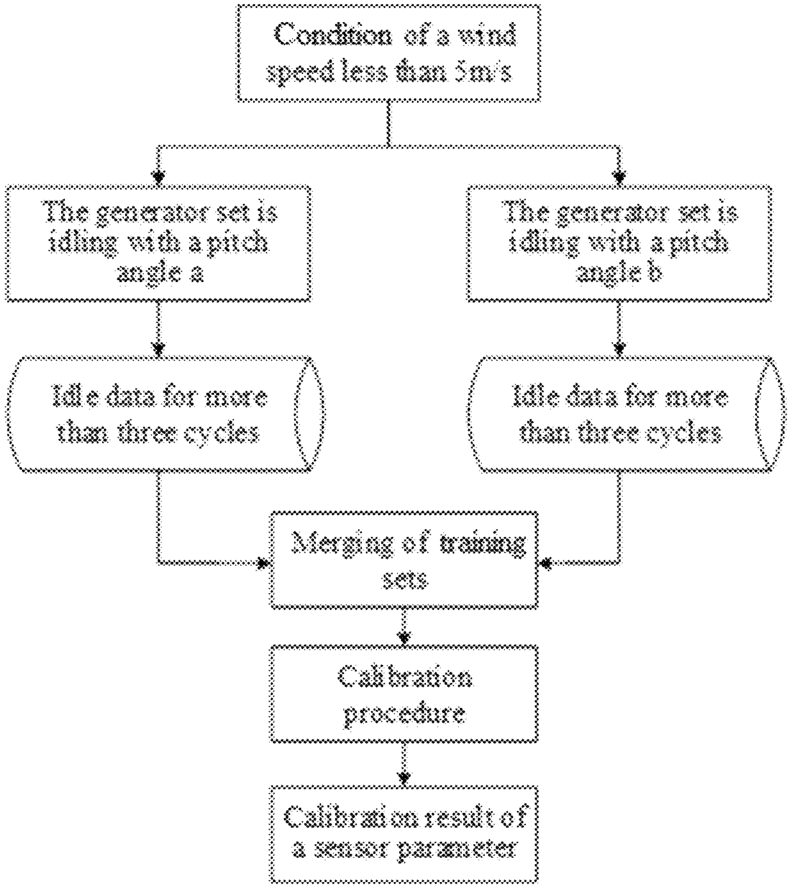
FIG. 4 is a flowchart illustrating a method for calibrating a load sensor according to a preferred embodiment of the present disclosure.

FIG. 4 is a flowchart illustrating a method for calibrating a load sensor according to an embodiment of the present disclosure. As shown in FIG. 4, the method is a flow calibration scheme based on idle data of two predetermined pitch angles. This method is different from the method shown in FIG. 2 in that: the method in FIG. 4 is to obtain the operation data through an active intervention of the operating state of the generator set by a main control program, which does not require manual locking of an impeller.

In this embodiment, under a condition that an average wind speed does not exceed a predetermined speed within a predetermined time period, the generator set is controlled to idle at different predetermined pitch angles, and operation data of the generator set idling under different predetermined pitch angles for more than three cycles is obtained. The obtained operation data is merged to obtain a training set for calibration. For example, the predetermined time period may be set based on an actual need, such as 3 seconds or 10 seconds. The predetermined speed may be set based on an actual need, such as 5 m/s. Specifically, in the method, the following operations are performed in a short time period (such as 3 seconds or 10 seconds) under a condition that a wind speed does not exceed 5 m/s. The generator set is controlled to idle at a first pitch angle, a, for more than three cycles and operation data of the generator set is obtained. Then, the generator set is controlled to idle at a second pitch angle, b, for more than three cycles and operation data of the generator set is obtained. The two sets of operation data may be merged to obtain the training set for calibration.

Regarding this calibration scheme, the following points need to be noted.

(a) The first pitch angle a and the second pitch angle b are determined such that an angle difference between the two is as large as possible. This is because that a greater angle difference between the two pitch angles is theoretically more conducive to accuracy of the calibration. A minimum angle difference between the two pitch angles may be 30 degrees.

(b) To ensure the accuracy of the calibration, a length of the operation data corresponding to the first pitch angle a should be as close as possible to a length of the operation data corresponding to the second pitch angle b, avoiding significant difference between the lengths. As mentioned above, the operation data may include multiple types of data, and the length of the operation data refers to a quantity of each type of data in the operation data.

(c) It is necessary to check and ensure validity and continuity of data of the azimuth sensor. In a case that there is a reset action on the azimuth sensor, a data removal processing is also required.

Reference is made to FIG. 1. After the training set for calibration is obtained, the load sensor is calibrated based on the training set for calibration (step S103). For example, a computing device calibrates the load sensor based on the training set for calibration after obtaining the training set for calibration and obtains a calibration result. The computing device transmits the calibration result to the controller of the wind turbine through wired or wireless communication. The calibration result may include the updated parameter of the load sensor. Afterwards, the controller of the wind turbine may contribute to subsequent control and protection of the generator set based on the updated parameter of the load sensor.

According to the embodiment of the present disclosure, the calibration of the load sensor based on the training set for calibration training may be realized through the following steps. An actual strain of a load for the load sensor is obtained based on the training set for calibration, and the load sensor is calibrated based on a theoretical strain, the actual strain, and a minimized loss function. The theoretical strain refers to a theoretical measurement of a strain due to the load.

Specifically, after the training set for calibration is obtained through the method as shown in FIG. 2 and FIG. 4, the sensor may be calibrated based on the obtained training set for calibration. A calibration program may be developed based on various programming languages, such as Python, Matlab, C++, and the like. The program content includes the following calibration principles and corresponding optimization algorithms.

The measured strain of a load for a fiber optic load sensor at a blade root may be expressed as:

$$\varepsilon_m = \frac{1}{k_\varepsilon}\left(\frac{\lambda_B - \lambda_{B,0}}{\lambda_{B,0}}\right) \tag{1}$$

Signs in the equation are explained below:

$\varepsilon_m$: actual strain, which is dimensionless;

$\lambda_{B,0}$: initial wavelength, which is a wavelength measured by the fiber optic load sensor at a blade root without deformation, in a unit of [nm];

$\lambda_B$: measured wavelength, which is an actual wavelength measured by the fiber optic load sensor at a blade root in an operating state, in a unit of [nm];

$k_\varepsilon$: strain coefficient of the sensor, indicating a coefficient for converting from the measured wavelength to the strain, which is dimensionless.

Under a condition of light wind (an instantaneous wind speed not exceeding 5 m/s), loads of the blade root in an edge direction and a flap direction are determined by gravity torque load for the blade, and influence of an aerodynamic load may be ignored. Therefore, under the condition of light wind (the instantaneous wind speed not exceeding 5 m/s), the gravity torque load may be determined as a theoretical load, and the wavelength and load coefficient matrix of the fiber optic load sensor at the blade root may be calibrated by using the gravity torque load. The edge direction refers to an edge-wise blade root load, indicating a load generated at the blade root when the blade undergoes deformation in a left-right swing direction. The flap direction refers to a flap-wise blade root load, indicating a load generated at the blade root when the blade undergoes deformation in a forward and backward swing direction.

A theoretical gravity torque load is calculated as:

$$\overline{M}_G = \begin{pmatrix} M_{G,x} \\ M_{G,y} \end{pmatrix} = F_G\begin{pmatrix} \sin(\delta)\cos(\theta)\sin(\phi) + \cos(\delta)(\sin(\Omega)\cos(\phi) + \cos(\Omega)\sin(\theta)\sin(\phi)) \\ -\cos(\delta)(\sin(\Omega)\sin(\phi) - \cos(\Omega)\sin(\theta)\cos(\phi)) + \sin(\delta)\cos(\theta)\cos(\phi)) \end{pmatrix} \tag{2}$$

Signs in the equation are explained below:

$M_{G,x}$: gravity torque in the edge direction, in a unit of [Nm];

$M_{G,y}$: gravity torque in the flap direction, in a unit: [Nm];

$F_G$: gravity torque in a fixed coordinate system, in a unit of [Nm], calculated as a mass of the impeller multiplied by a length of a force arm from a center-of-gravity position to an installation position of the sensor;

δ: tilt angle of a main axis, in a unit of [rad]. Specifically, the tilt angle is positive in a case that the main axis is inclined upwards, and vice versa; the tilt angle of the main axis refers to an angle at which the main axis of an engine room deviates from the horizontal direction, defining an upward lifting direction of the impeller to be positive;

θ: cone angle of a impeller plane, in a unit of [rad]. Specifically, the cone angle is negative in a case that the impeller plane collapses towards a windward direction, and vice versa; the cone angle of the impeller plane refers to an angle generated by the impeller plane deviating from a plane where the blade root is located and collapsing towards the windward direction;

Ω: azimuth angle of a blade, in a unit of [rad]. Specifically, when measured in a unit of angle degree, a vertically upward direction from blade 1 is defined as 0 degree, and the angle increases clockwise, a vertically downward direction from blade 1 is defined as 180 degrees; and ϕ: pitch angle of a blade, in a unit of [rad]. Specifically, when measured in a unit of angle degree, it is defined as −90 degrees when the blade is fully feathered and 0 degree when the blade is fully opened.

Based on the above, a relationship between the strain and the load is expressed as:

$$\varepsilon_s = \frac{1}{K_B(\phi_s)} \cdot P_s \cdot \overline{M}_G \tag{3}$$

Signs in the equation are explained below:

$$\varepsilon_s = \begin{Bmatrix} \varepsilon_{s1} \\ \varepsilon_{s2} \\ \varepsilon_{s3} \\ \varepsilon_{s4} \end{Bmatrix}$$

strain, which is dimensionless;

$K_B(\phi_s)$: stiffness coefficient of a blade, in a unit of [$N_m$/m/m], hereinafter abbreviated as $K_B$;

$\phi_s$: installation position of a sensor, which dimensionless;

$$P_s = \begin{bmatrix} \cos(\phi_{s1}) & \sin(\phi_{s1}) \\ \cos(\phi_{s2}) & \sin(\phi_{s2}) \\ \cos(\phi_{s3}) & \sin(\phi_{s3}) \\ \cos(\phi_{s1}) & \sin(\phi_{s1}) \end{bmatrix}$$

coordinate change matrix of the sensor, which is dimensionless;

Equation (3) indicates a strain that should theoretically be measured under a given load $\overline{M}_G$. Based on Formula (1) and Formula (3), the minimized loss function is defined as follows:

$$\min((\varepsilon_s - \varepsilon_m)^2) = \min\left(\left(\frac{1}{K_B(\phi_s)} \cdot P_s \cdot \overline{M}_G - \frac{1}{k_\varepsilon}\left(\frac{\lambda_B - \lambda_{B,0}}{\lambda_{B,0}}\right)\right)^2\right) \tag{4}$$

Nonlinear optimization may be performed on formula (4) to calibrate the to-be-solved parameters $K_B$, $\phi_s$, $k_\varepsilon$, $\lambda_{B,0}$, and the like.

The method for calibrating a load sensor proposed in the present disclosure may be applied to different usage scenarios. With the method for calibrating a load sensor based on normal operation data of a generator set, an analysis of effectiveness of the collected data can be performed without interfering with the operating state of the generator set. The operation data obtained from filtering is then used for randomly sampling and azimuth-based distribution, so as to obtain a training set for calibration. The load sensor at a blade root is calibrated based on the training set for calibration. The method is suitable for regular or irregular long-term online calibration, and can enhance an environmental adaptability of a fiber optic load sensor under mismatch of a temperature coefficient. The method for calibrating a load sensor based on idle data at two predetermined pitch angles is more similar in form to a widely used semi-auto . . . calibration method at present. The method in the present disclosure avoids complexity of manual operations such as locking the impeller and is suitable for active data collection and centralized calibration. Therefore, the method can realize a shorter implementation cycle and has low requirement on configuration of the generator set.

The following points should be noted. 1) In the above formula (1), the sensor coefficient and the initial wavelength are combined into one parameter, which is simplified as $\varepsilon_m = c(\lambda_B - \lambda_{B,0})$. Correspondingly, the formula (4) needs to be adjusted accordingly. 2) Under the definition of (1), formula (4) may be solved by using linear optimization methods instead of nonlinear optimization. 3) In terms of verification of a calibration result, in addition to the comparison with the theoretical load and the semi-auto calibration result, as mentioned in the above embodiments, the calibration result may be compared with a simulated load. 4) In the method for calibrating a load sensor based on normal operation data of a generator set, the generation of the training set for calibration may adopt other data partitioning method to replace the azimuth-based method as in the above embodiment. 5) In the method based on idle data at two predetermined pitch angles, the number of angles for idling may be increased to three or more.

Based on the same inventive concept, a device for calibrating a load sensor is further provided in the present disclosure. The device is configured to calibrate the load sensor through a method same as shown in FIG. 1. Therefore, a calibration process is not repeated in detail here.

Figure 5:
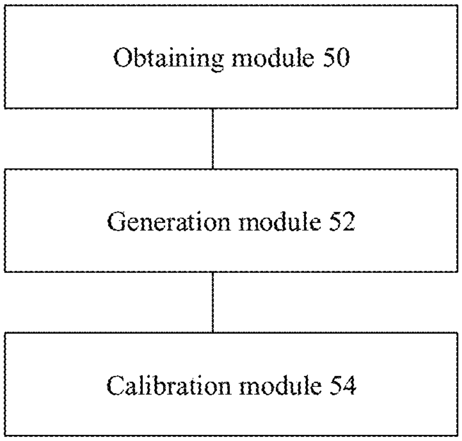
FIG. 5 is a block diagram illustrating a device for calibrating a load sensor according to an embodiment of the present disclosure.

FIG. 5 shows a block diagram of the device for calibrating a load sensor according to an embodiment of the present disclosure. The device includes an obtaining module 50, a generation module 52, and a calibration module 54.

The obtaining module 50 is configured to obtain operation data of a wind turbine, where the operation data includes data of the wind turbine operating in a normal state or data of the wind turbine operating in an idle state under different predetermined pitch angles. The generation module 52 is configured to generate, based on the operation data, a training set for calibration. The calibration module 54 is configured to calibrate the load sensor based on the training set for calibration.

In an embodiment of the present disclosure, the operation data includes data of the wind turbine operating in a normal state, and the generation module 52 is configured to: filter the operation data based on a preset filtering condition, to obtain a first dataset; divide, based on each pitch angle in the first dataset, the first dataset into a set for pitch angles at idle and a set for pitch angles not at idle, where the set for pitch angles not at idle includes operation data in the first dataset except for a pitch angle at idle; and perform random sampling on operation data in the set for pitch angles at idle and operation data in the set for pitch angles not at idle, respectively, to obtain data points, and generate the training set for calibration based on azimuth angles in the data points, where each of the data points is a piece of the operation data at a time instant.

In an embodiment of the present disclosure, the generation module 52 is configured to obtain the data points from the set for pitch angles at idle and a set for pitch angles not at idle through the random sampling; distribute the operation data into corresponding azimuth bins, according to the azimuth angles in the data points, until a quantity of the operation data in each of the azimuth bins reaches a predetermined value; merging operation data from all the azimuth bins to generate the training set for calibration.

In an embodiment of the present disclosure, each of the azimuth bins is a storage area corresponding to an angle interval of angle intervals determined by evenly dividing 360 degrees, where each azimuth bin covers a first predetermined angle. Each angle interval corresponds to two azimuth bins, and the two azimuth bins correspond to the set for pitch angles at idle and the set for pitch angles not at idle, respectively.

In an embodiment of the present disclosure, the obtaining module 50 is configured to obtain operation data of the wind turbine at equal intervals within a predetermined time period as first datasets. The generation module is configured to filtering, based on the preset filtering condition, the first datasets obtained at the equal intervals, respectively.

In an embodiment of the present disclosure, the operation data includes data of the wind turbine operating in an idle state under different predetermined pitch angles, and the obtaining module 50 is configured to: obtain first idle data, where the first idle data includes operation data of the wind turbine idling under a first predetermined pitch angle for at least three cycles; obtain second idle data, where the second idle data includes operation data of the wind turbine idling under a second predetermined pitch angle for at least three cycles; and merge the first idle data and the second idle data to obtain a second dataset as the operation data.

In an embodiment of the present disclosure, the generation module 52 is configured to determine the second dataset as the training set for calibration.

In an embodiment of the present disclosure, the first predetermined pitch angle is greater than or equal to a second predetermined angle, the second predetermined pitch angle is greater than or equal to the second predetermined angle, and a difference between the first predetermined pitch angle and the second predetermined pitch angle is greater than a third predetermined angle.

In an embodiment of the present disclosure, the obtaining module 50 is configured to obtain operation data of the wind turbine continuously during a predetermined time period; or obtain operation data of the wind turbine at equal intervals within a predetermined time period.

In an embodiment of the present disclosure, the calibration module 54 is configured to: obtain, based on the training set for calibration, an actual strain of a load for the load sensor; and calibrate the load sensor based on a theoretical strain, the actual strain and a minimized loss function, where the theoretical strain refers to a theoretical measurement of a strain due to the load.

Figure 6:
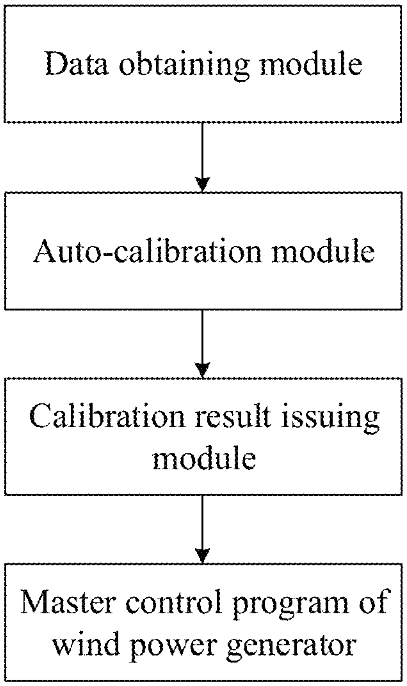
FIG. 6 is a schematic diagram illustrating a system for calibrating a load sensor according to an embodiment of the present disclosure.

A system for calibrating a load sensor is further provided according to an embodiment of the present disclosure. FIG. 6 is a schematic diagram illustrating a system for calibrating a load sensor according to an embodiment of the present disclosure. As shown in FIG. 6, the system includes: a data obtaining module (functionally equivalent to the obtaining module 50 as mentioned above), an auto calibration module (equivalent to the generation module 52 and the calibration module 54 as mentioned above), a calibration result issuing module, and a main control program of a wind turbine. The modules are described below.

The data acquisition module is configured to obtain signals, including a pitch angle of each of three blades of a generator set, an azimuth angle of an impeller, a wind speed, a rotation speed of the impeller, a left-right yaw, a yaw deviation to wind, an operating state word, a measured wavelength of a fiber optic load sensor at a lade root, and the like.

The auto calibration module includes a core algorithm for calibration, and is configured to perform data preprocessing, filtering, calibration and other calculations on the data obtained by the data obtaining module. The auto calibration module may be physically located in a stand-alone controller, a field level controller, an edge computing unit of the generator set, or a cloud computing unit.

The calibration result issuing module is configured to distribute a sensor parameter calculated by the auto calibration module to the main control program of the wind turbine of the generator set. This module may transmit data through wired or wireless data transmission.

The main control program of the wind turbine is configured to apply the updated sensor parameter for subsequent control or protection of the generator set.

In the above embodiments of the present disclosure, data required for calibration of the fiber optic load sensor at a blade root is obtained, without or with minimal human intervention, and the sensor parameter is calibrated through an automatic calibration program. The calibration process has a high level of automation, high calibration accuracy, and strong environmental adaptability. In addition, the intervention of the calibration process on the generator set is minimized, so that the loss of power generation caused by calibration of the sensor is avoided and labor cost is saved.

In an embodiment of the present disclosure, a computer-readable storage medium storing instructions is provided. The instructions, when executed by at least one computing device, configure the at least one computing device to execute the method for calibrating a load sensor.

In an embodiment of the present disclosure, there is provided a system including at least one computing device and at least one storage device storing instructions. The instructions, when executed by at least one computing device, configure the at least one computing device to execute the method for calibrating a load sensor.

In order to ensure effectiveness of the calibration algorithm in the above embodiments, verification of the calibration algorithms in two scenarios is provided below.

(1) a Full-Auto Calibration Based on Normal Operation Data of the a Generator Set The algorithm is validated by using operation data of a generator set in a certain wind power plant. Each blade of the generator set is installed with four sensors spaced at 90 degrees. The auto calibration data is obtained by Xbox from 19:7:3 on Jun. 8, 2020 to 12:8:29 on Jun. 17, 2020, with a sampling period of 20 milliseconds. A total of 284 sets of 10-minute data are obtained. After a validity filtering on the data, a total of 383800 valid data points are obtained.

Figure 7:
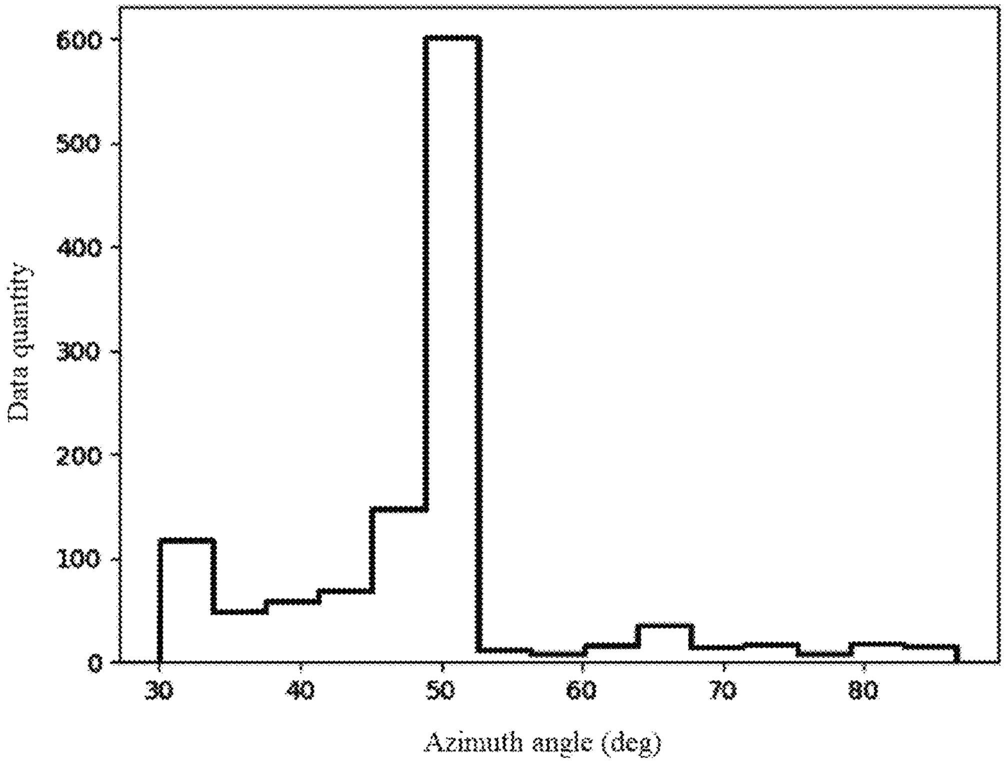
FIG. 7 is a histogram showing distribution of pitch angles in a training set for calibration of a generator set obtained after a random sampling according to an embodiment of the present disclosure.

FIG. 7 is a histogram showing a distribution of pitch angles in a training set for calibration of a generator set obtained after a random sampling according to an embodiment of the present disclosure. As shown in FIG. 7, a horizontal axis represents an azimuth angle and a vertical axis represents a quantity of data. The histogram shows a distribution of pitch angles in data of a training set for calibration of a generator set in a wind power plant obtained after a random sampling of the generator set. A pitch angle at idle of the generator set is 50 degrees. Based on the azimuth-based distribution, it can be seen that a data volume for the 50-degree pitch angle in the final training set for calibration training is 12 bins*50 data/bin=600 data. Distribution of other pitch angles covers a range from 30 degrees to 90 degrees, also having a data volume of 600. The total volume of data in the training set for calibration is 1200. In the training set for calibration, there are data for operating mode 3 of the generator set is in a quantity of 740, and the remaining data is for mode 4, in a quantity of 460.

The verification of an auto calibration result main includes two types as follows.

Figure 8:
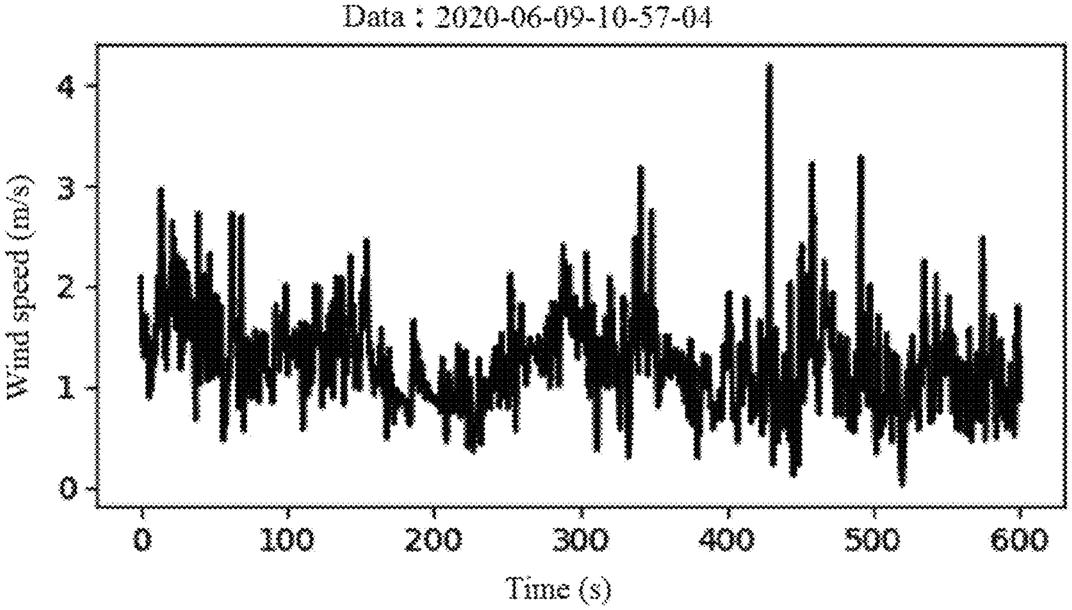
FIG. 8, FIG. 9, and FIG. 10 are timing diagram of a wind speed in validation data in a power generation condition for calibration of a generator set according to an embodiment of the present disclosure.
Figure 9:
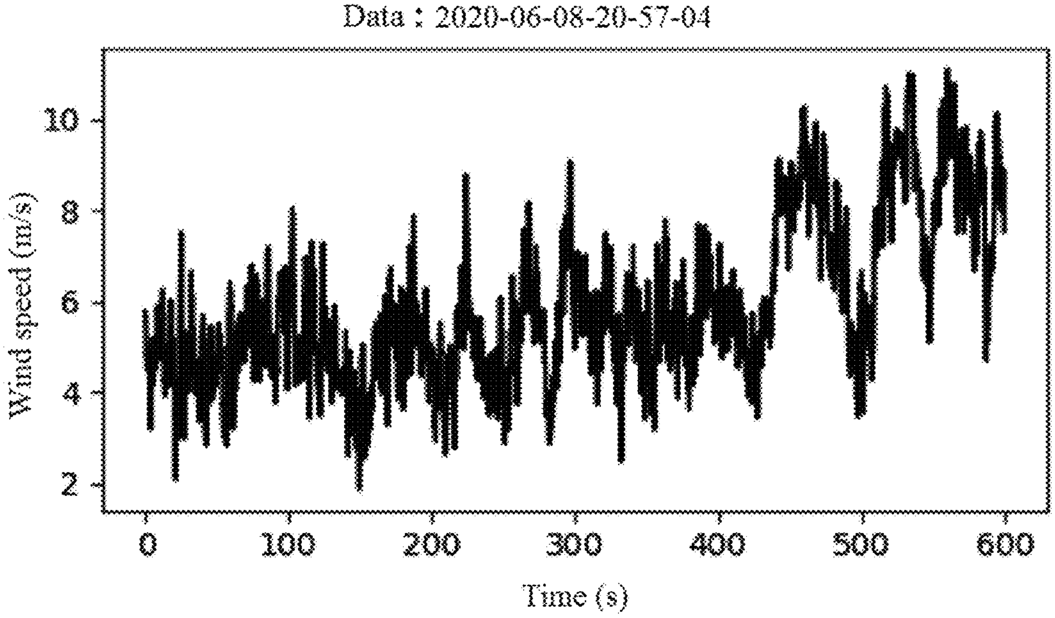
Figure 10:
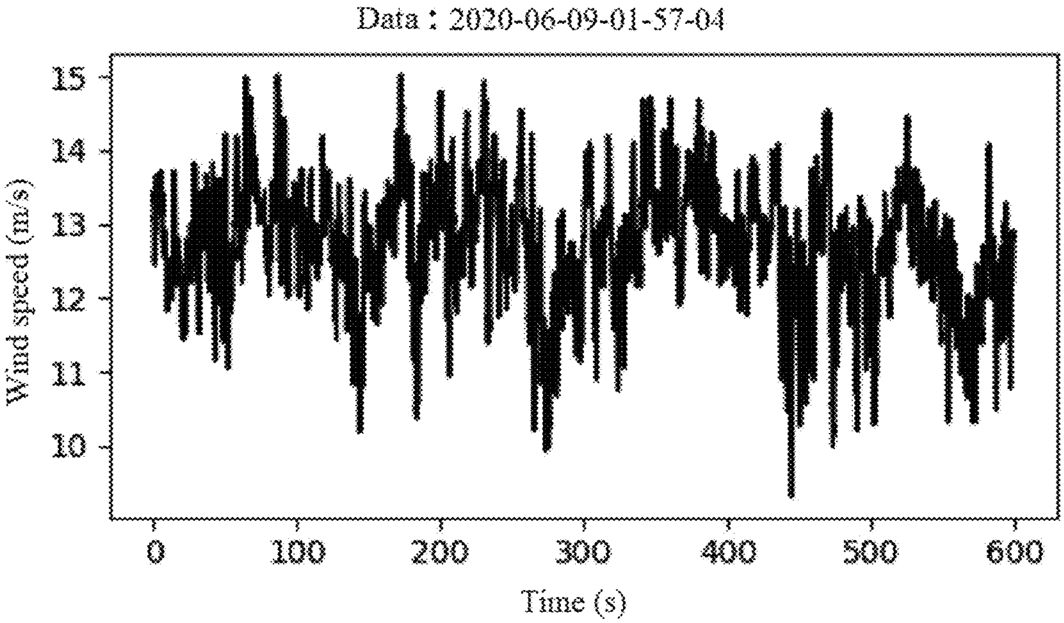

1) Verification by comparing an idle load to a theoretical load;

2) A set of data under a power generation condition of light wind and a set of data under a power generation condition of heavy wind are selected randomly to be compared with a semi-auto calibration of a locked impeller for load comparison. The semi-auto calibration of the generator set was conducted on Apr. 3, 2020. A time series diagram of a wind speed of these three sets of data is shown in FIG. 8 to FIG. 10, respectively. In the Figures, a horizontal axis represents time and a vertical axis represents a wind speed. FIG. 8 is a first time series diagram of a wind speed showing validation data of a power generation condition of a generator set according to an embodiment of the present disclosure. The wind speed scenario shown in FIG. 8 is idle data, with an average wind speed of 1.3 m/s. FIG. 9 is a second time series diagram of a wind speed showing validation data of a power generation condition of a generator set according to an embodiment of the present disclosure. The wind speed scenario shown in FIG. 9 is data for light wind, with an average wind speed of 5.9 m/s. FIG. 10 is a third time series diagram of a wind speed showing validation data of a power generation condition of a generator set according to an embodiment of the present disclosure. The wind speed scenario shown in FIG. 10 is data for heavy wind, with an average wind speed of 12.7 m/s.

It should be noted that the result of the semi-auto calibration is not a reference standard. The semi-auto calibration and the auto calibration are two calibration methods independent from each other, and results of the two are mutually verified. In a case that the results of the two are consistent, the effectiveness of the calibration scheme can be confirmed to a certain extent.

Verification of Calibration for Idling

Under an idle condition, a theoretical calculated load may be used as a direct reference object for timing comparison and calibration verification of a calibrated load. A load comparison of three blades in an edge direction and a flap direction is shown in Table 2. FIGS. 11A to 11F are schematic diagrams showing comparison of time series of an auto calibration of an idle load according to an embodiment of the present disclosure. In FIGS. 11A to 11F, a horizontal axis represents time and a vertical axis represents load, Medge of Blade refers to an edge direction of a blade, Mflap of Blade refers to a flap direction of a blade. A solid curve in each sub-figure represents a theoretical load calculated with a gravity torque, a long dashed line represents an auto calibrated load, and a short dashed line, that is, a dotted line, represents a semi-auto calibrated load. A greater value of an average error of the load calibrated by the two calibration methods compared with the theoretical load at a peak and valley is indicated in a legend of each figure.

It can be seen that the overall calibration accuracy of the two calibration methods in the edge direction is higher than that in the flap direction. The auto calibration of the two methods achieved higher accuracy, with an error of no more than 4% in both directions. The error of the semi-auto calibration of each of the three blades in the flap direction exceeds 15%.

TABLE 2

Schematic diagram of comparison of time series of auto calibration of an idle load

Figure 11A:
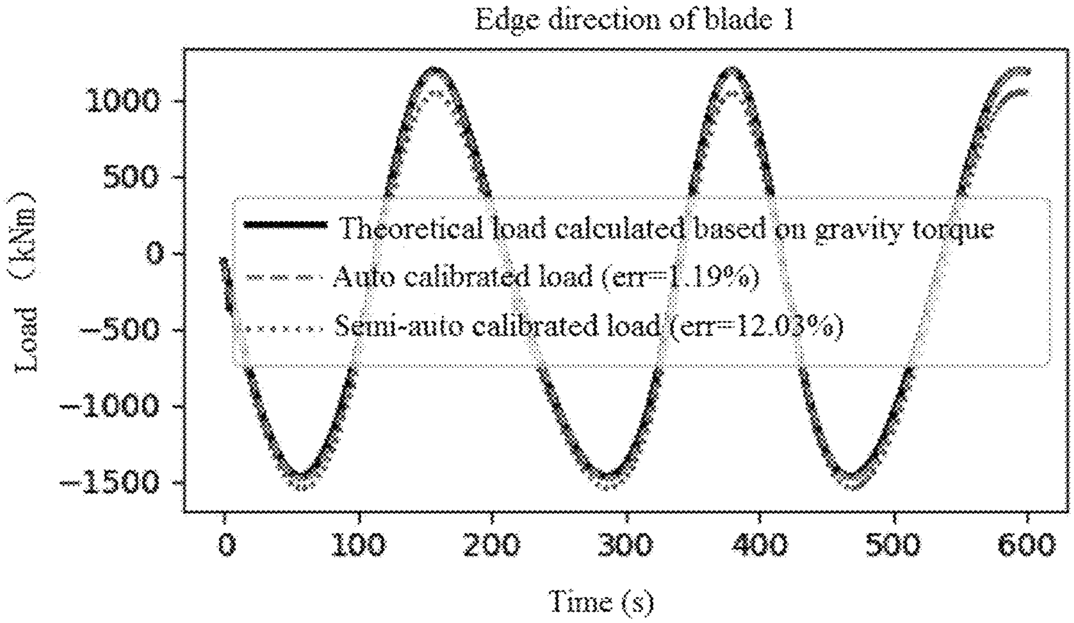
FIGS. 11A to 11F are schematic diagrams illustrating comparison of timings of an auto-calibrated idle load for a generator set according to an embodiment of the present disclosure.
Figure 11B:
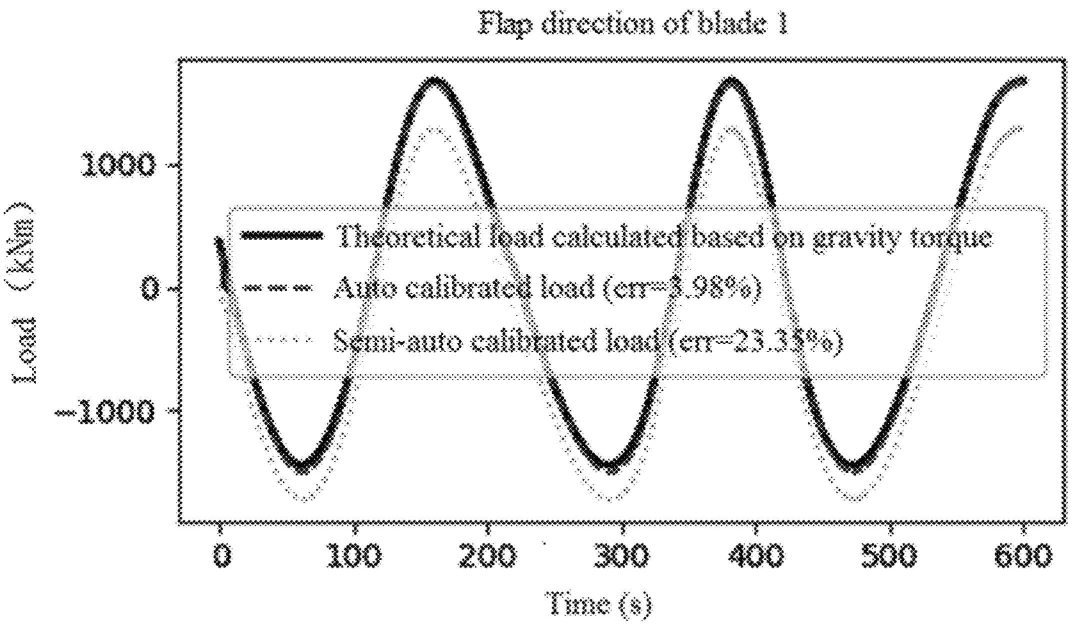
Figure 11C:
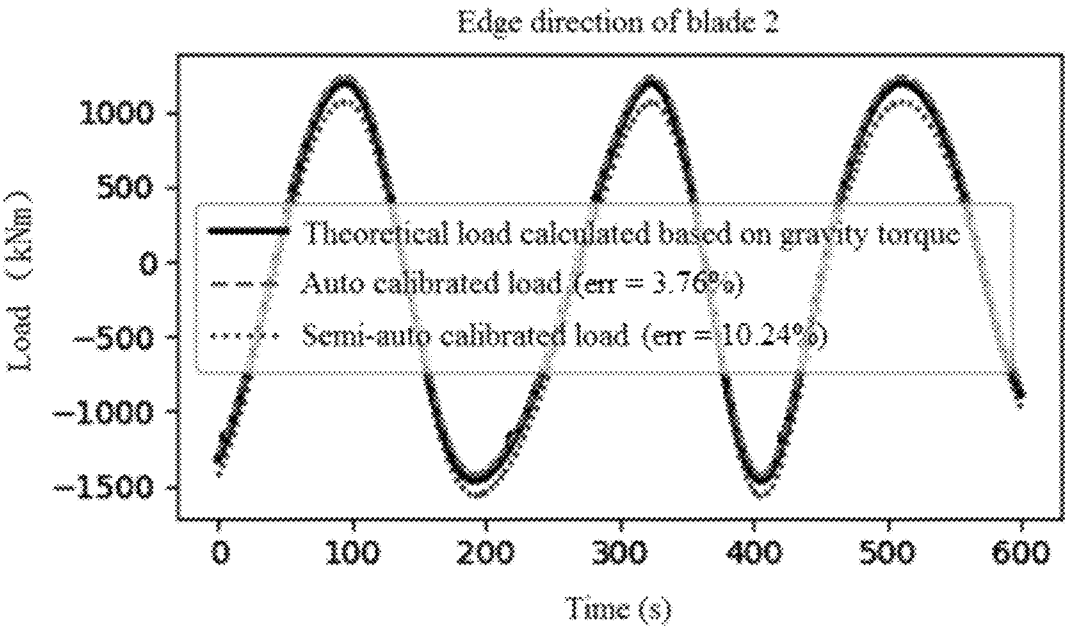
Figure 11D:
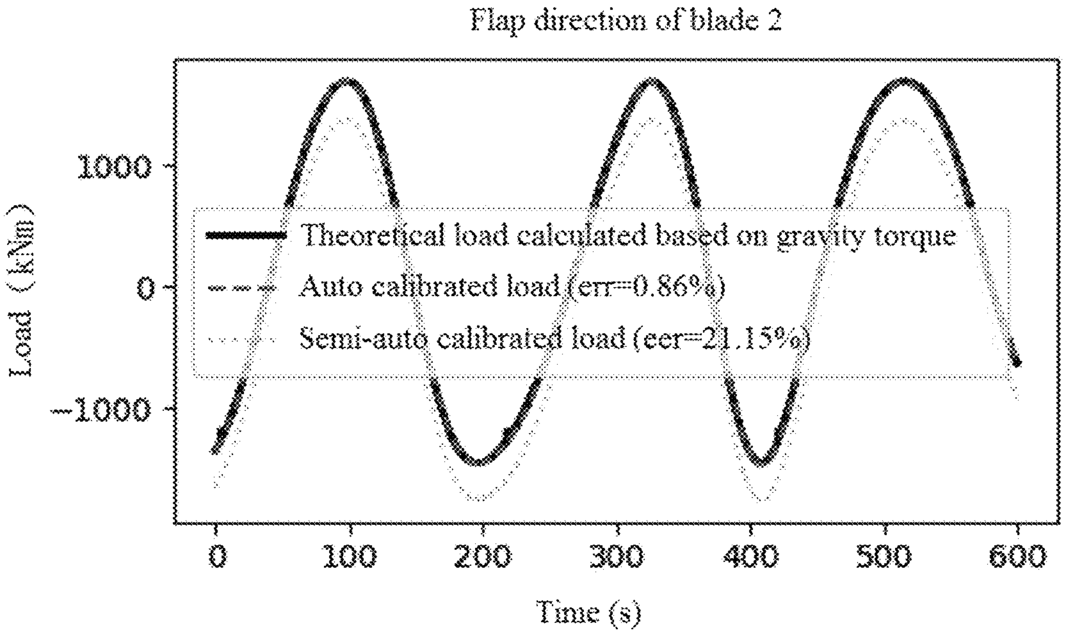
Figure 11E:
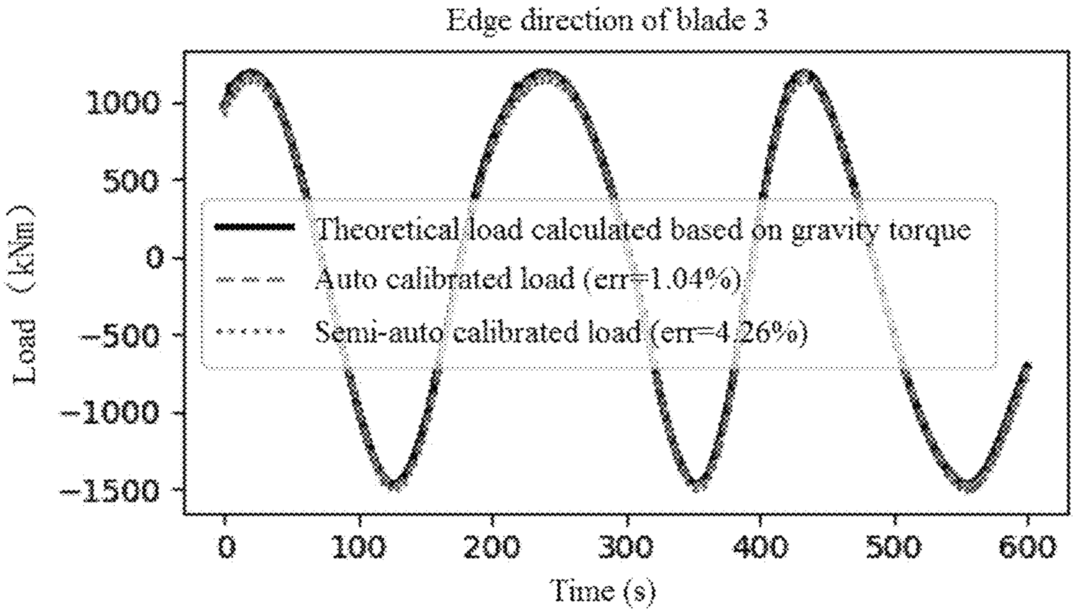
Figure 11F:
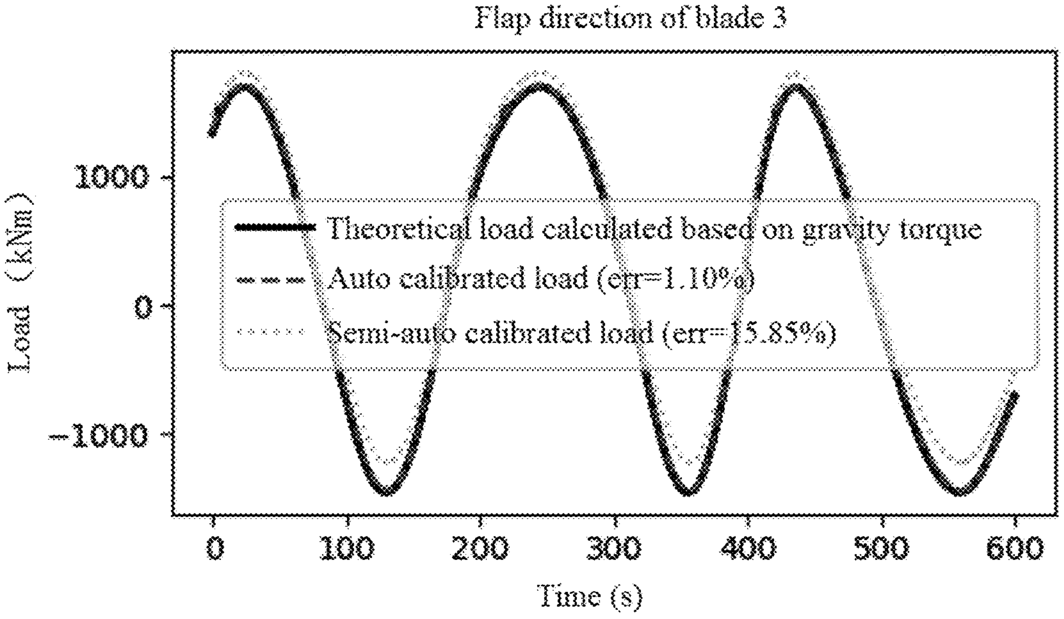

| Blade | Edge | Flap |
|---|---|---|
| 1 | As shown in FIG. 11A | As shown in FIG. 11B |
| 2 | As shown in FIG. 11C | As shown in FIG. 11D |
| 3 | As shown in FIG. 11E | As shown in FIG. 11F |

Verification of Calibration Under a Power Generation Condition of a Light Wind

Figure 12:
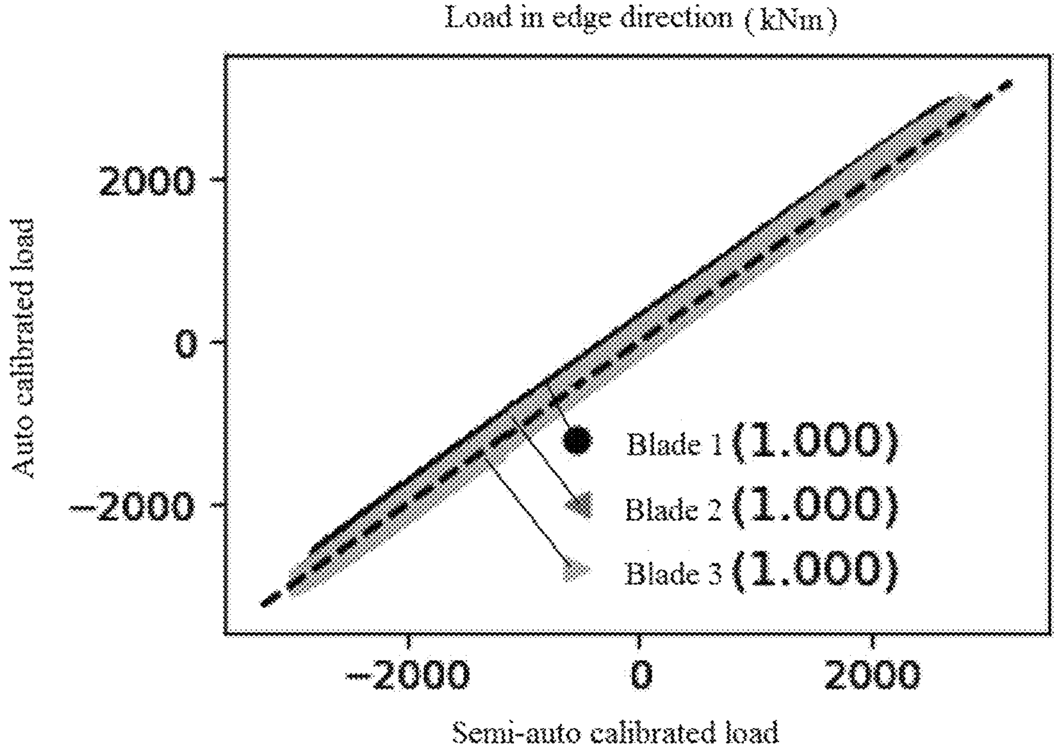
FIG. 12 is a scatter plot showing correlation of loads in an edge direction under a power generation condition of a light wind according to an embodiment of the present disclosure.
Figure 13:
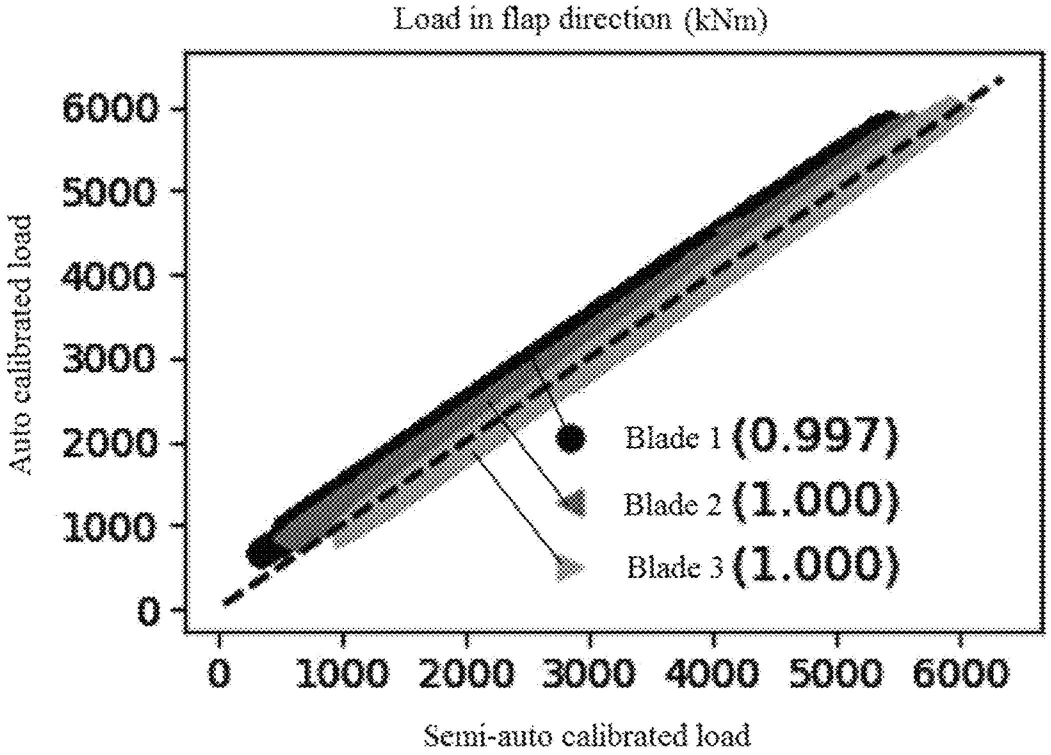
FIG. 13 is a scatter plot showing correlation of loads in a flap direction under a power generation condition of a light wind according to an embodiment of the present disclosure.

Under a power generation condition, a theoretical load cannot be calculated due to an aerodynamic factor. Therefore, a semi-auto calibrated load result is used as a reference for verifying an auto calibration result. Scatter plots of correlation between loads obtained by the two calibration methods in the edge direction and the flap direction under a light wind condition are as shown in FIG. 12 to FIG. 13, respectively. In the figures, a horizontal axis represents a semi-auto calibrated load, a vertical axis represents an auto calibrated load, the edge-wise load refers to a load in an edge direction, and a flap-wise load refers to a load in a flap direction. It can be seen that the correlation of calibrated loads of the three blades (blade1, blade2, blade3) in both directions exceeds 99.7% under both methods, and even approaches 100% in the edge direction, indicating a high correlation. For the convenience of display, the first 100 seconds of the 10-minute data are extracted and a time series load comparison is performed, as shown in Table 3. In FIG. 14A to FIG. 14F, a black solid line represents a semi-auto calibrated load, and a gray dashed line represents an auto calibrated load, a horizontal axis represents time, a vertical axis represents load, Medge of Blade refers to an edge direction of a blade, and Mflap of Blade refers to a flap direction of a blade. Consistent with the results in FIG. 12 and FIG. 13, loads in the edge direction obtained by the two calibration methods are close to each other, and detailed changes at peaks and valleys are highly consistent; and for the flap direction, loads calibrated by the two methods for on blade 3 achieves highest matching, and the auto calibrated loads on blade 1 and blade 2 are slightly higher than the semi-auto calibration results, respectively.

TABLE 3

Comparison of time series of an auto calibrated load for a generator set in a wind power plant under a light wind condition

Figure 14A:
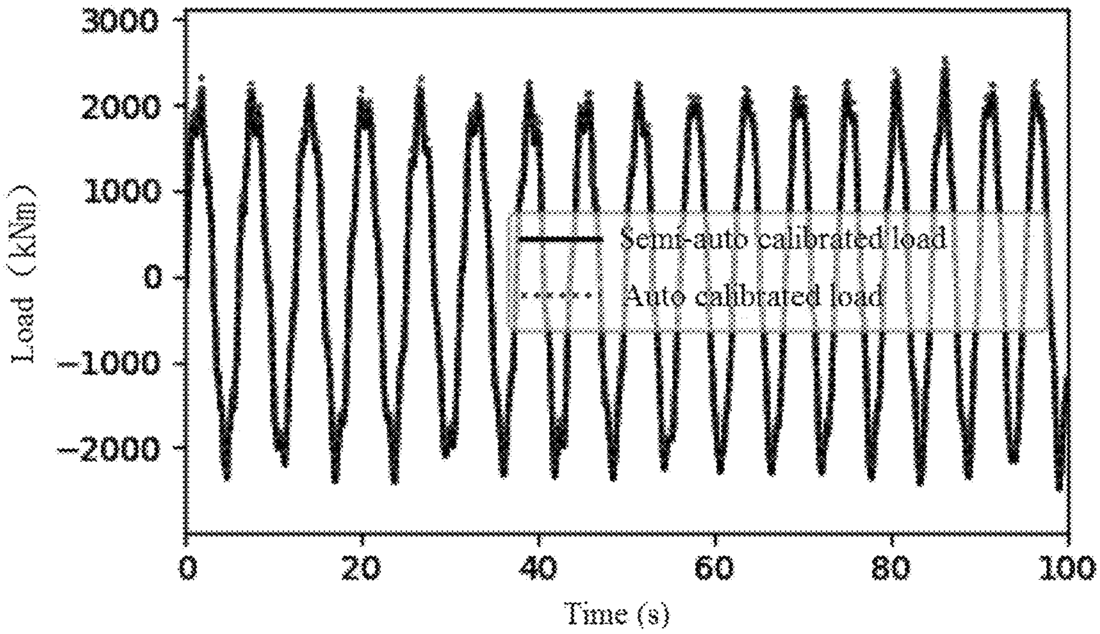
FIGS. 14A to 14F are schematic diagrams illustrating comparison of timings of an auto-calibrated load under a light wind condition according to an embodiment of the present disclosure.
Figure 14B:
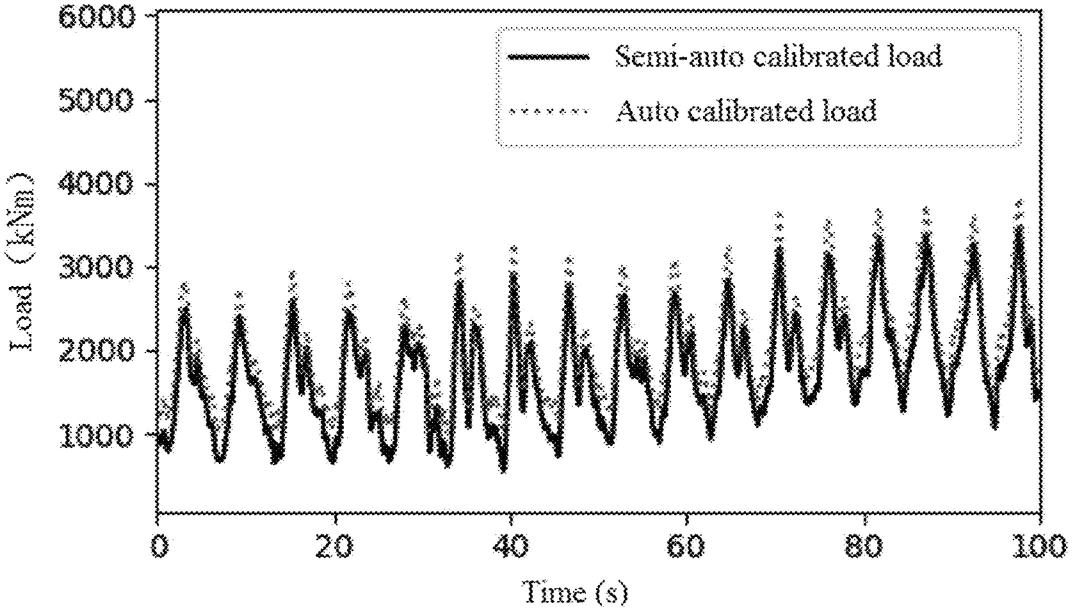
Figure 14C:
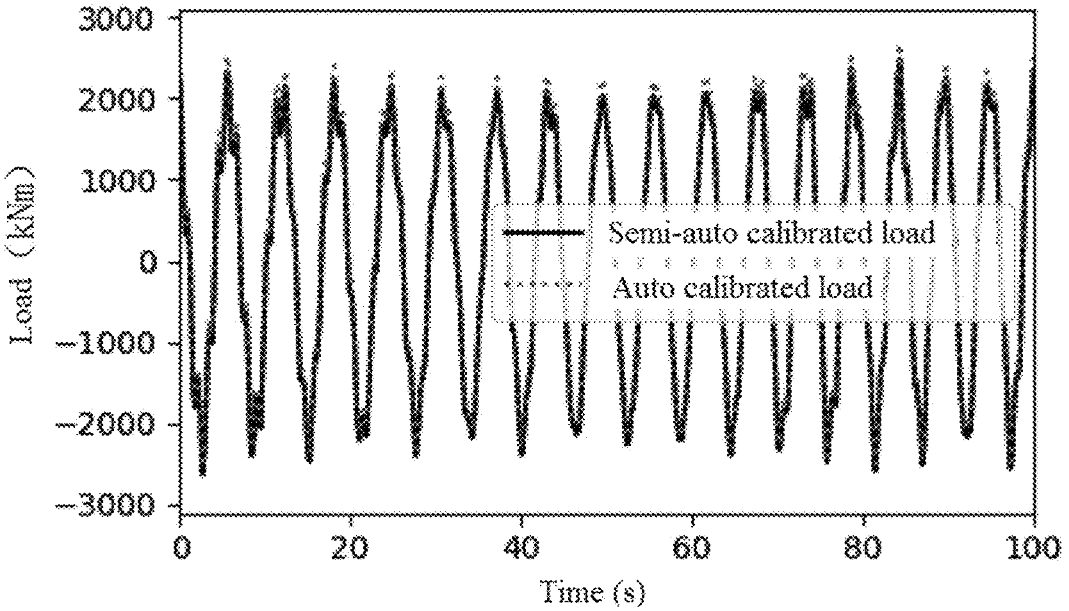
Figure 14D:
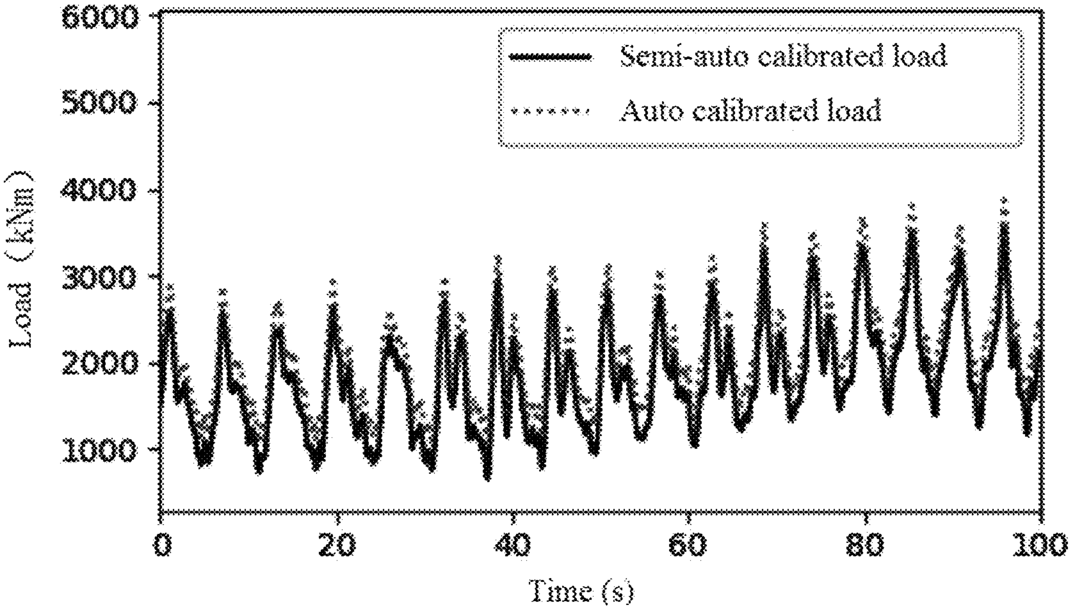
Figure 14E:
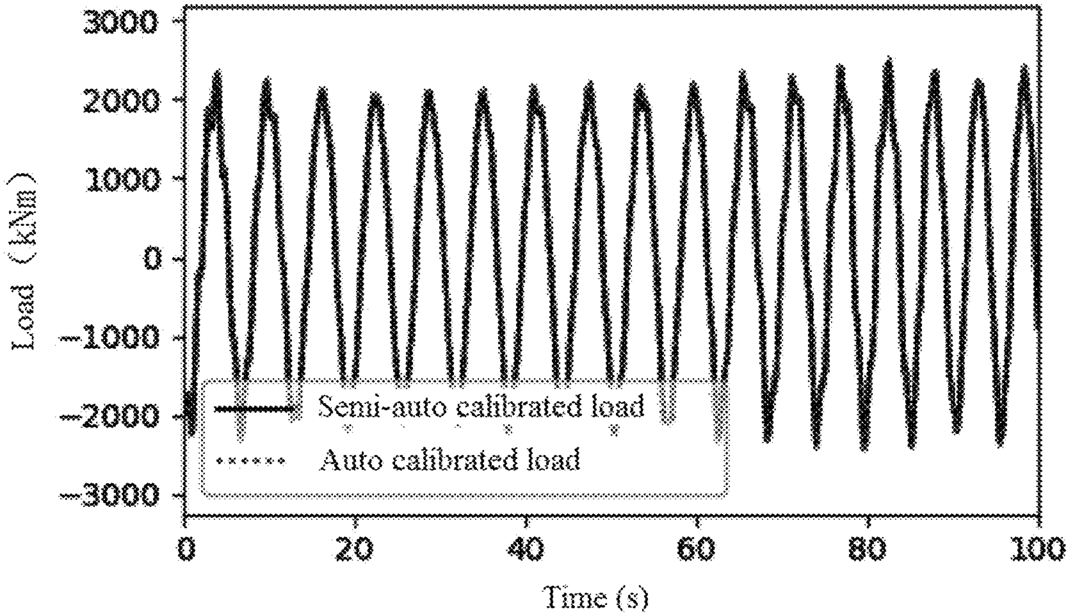
Figure 14F:
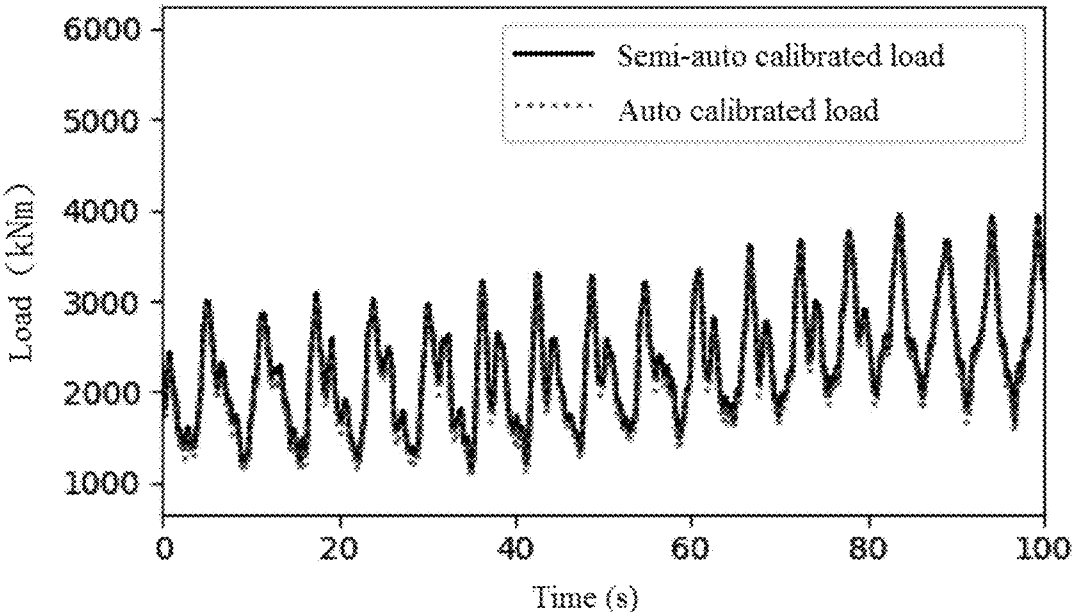

| Blade | Edge | Flap |
|---|---|---|
| 1 | As shown in FIG. 14A | As shown in FIG. 14B |
| 2 | As shown in FIG. 14C | As shown in FIG. 14D |
| 3 | As shown in FIG. 14E | As shown in FIG. 14F |

Verification of Calibration Under a Power Generation Condition of a Heavy Wind

Figure 15:
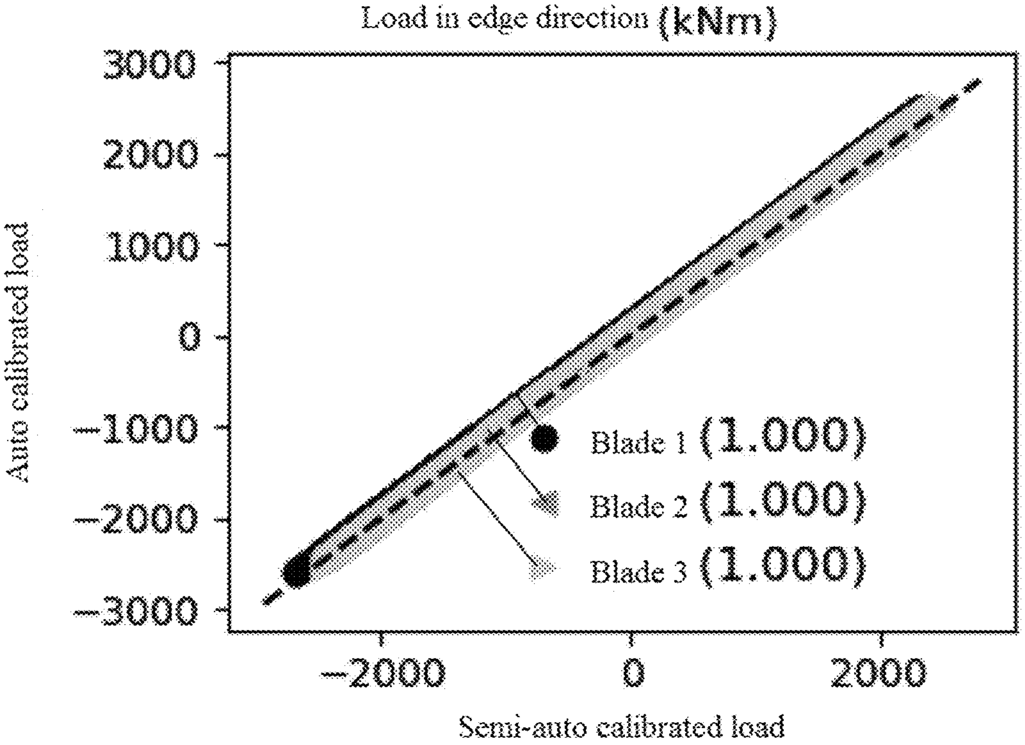
FIG. 15 is a scatter plot showing correlation of loads in an edge direction under a power generation condition of a strong wind according to an embodiment of the present disclosure.
Figure 16:
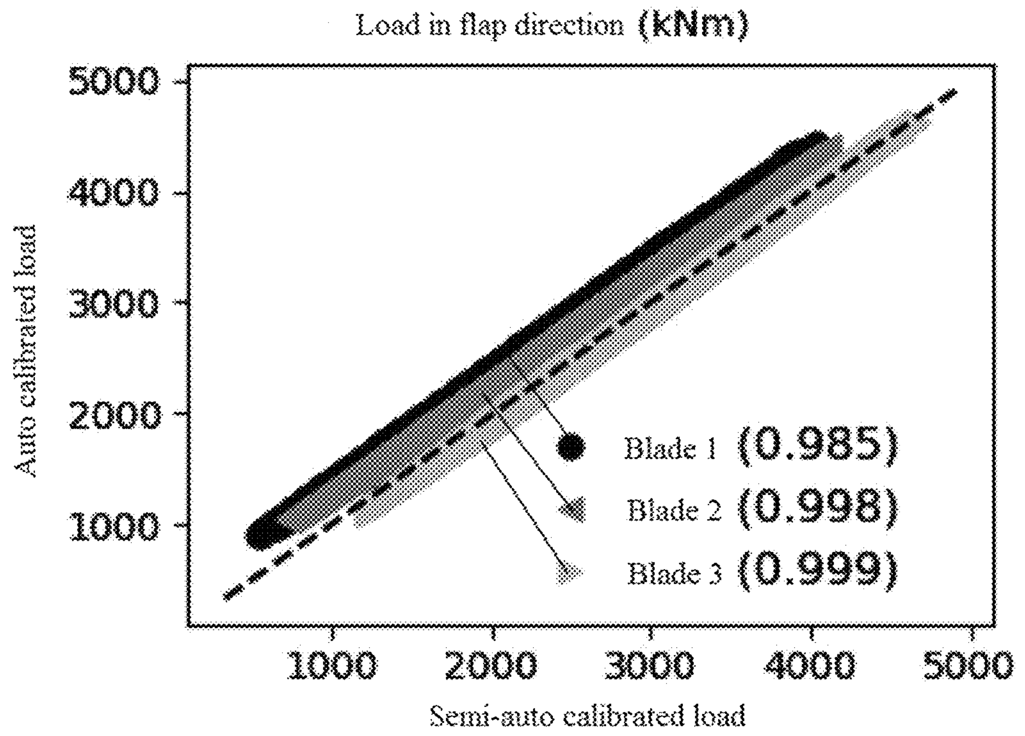
FIG. 16 is a scatter plot showing correlation of loads in a flap direction under a power generation condition of a strong wind according to an embodiment of the present disclosure.

Scatter plots of correlation between loads obtained by the two calibration methods in the edge direction and the flap direction under a heavy wind condition are as shown in FIG. 15 to FIG. 16, respectively. In the figures, a horizontal axis represents a semi-auto calibrated load, a vertical axis represents an auto calibrated load, the edge-wise load refers to a load in an edge direction, and a flap-wise load refers to a load in a flap direction. Blade 1, blade 2, and blade 3 represent a first blade, a second blade, and a third blade. The correlation between calibration loads through the two methods in the edge direction reaches 100%, and the correlation in the flip direction exceeds 98.5%. It can be clearly seen that the loads calibrated through the two methods on blade 3 has the highest consistency. On blade 1 and blade 2, there is a static difference between the auto calibrated load and the semi-auto calibrated load, which is stable within a range of under 5000 kNm.

A time series load comparison is shown in Table 4. A load comparison result is similar to that under the light wind condition. In FIG. 17A to FIG. 17F, a horizontal axis represents time, a vertical axis represents load, a solid line represents a semi-auto calibrated load, a dashed line represents an auto calibrated load, Medge of Blade refers to an edge direction of a blade, and Mflap of Blade refers to a flap direction of a blade.

TABLE 4

Comparison of time series of an auto calibrated load for a generator set in a wind power plant under a high wind condition

Figure 17A:
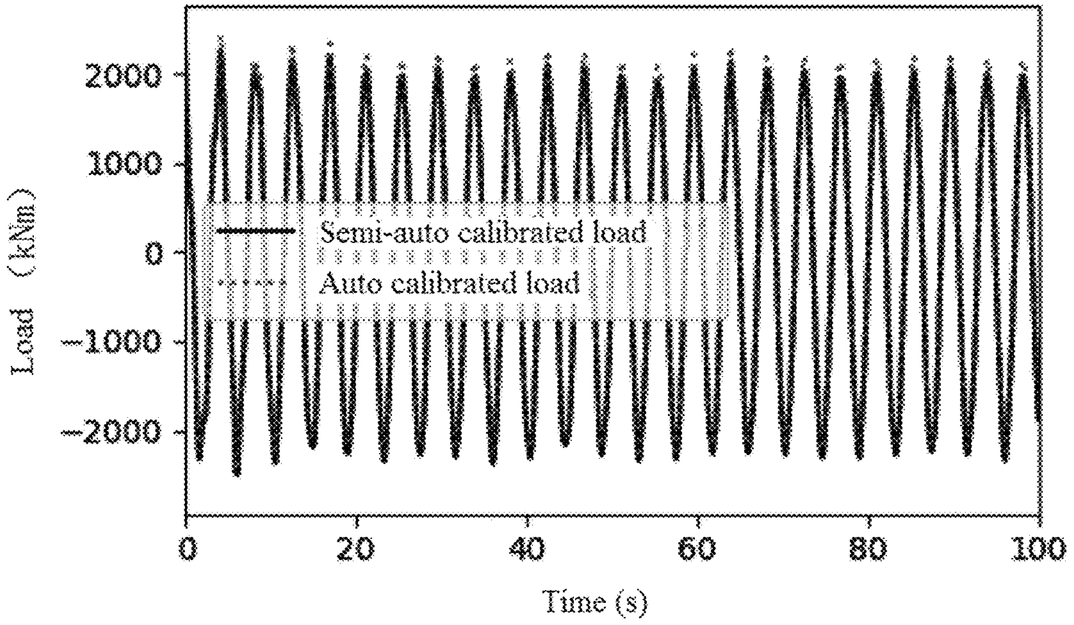
FIGS. 17A to 17F are schematic diagrams illustrating comparison of timings of an auto-calibrated idle load for a generator set under a strong wind condition according to an embodiment of the present disclosure.
Figure 17B:
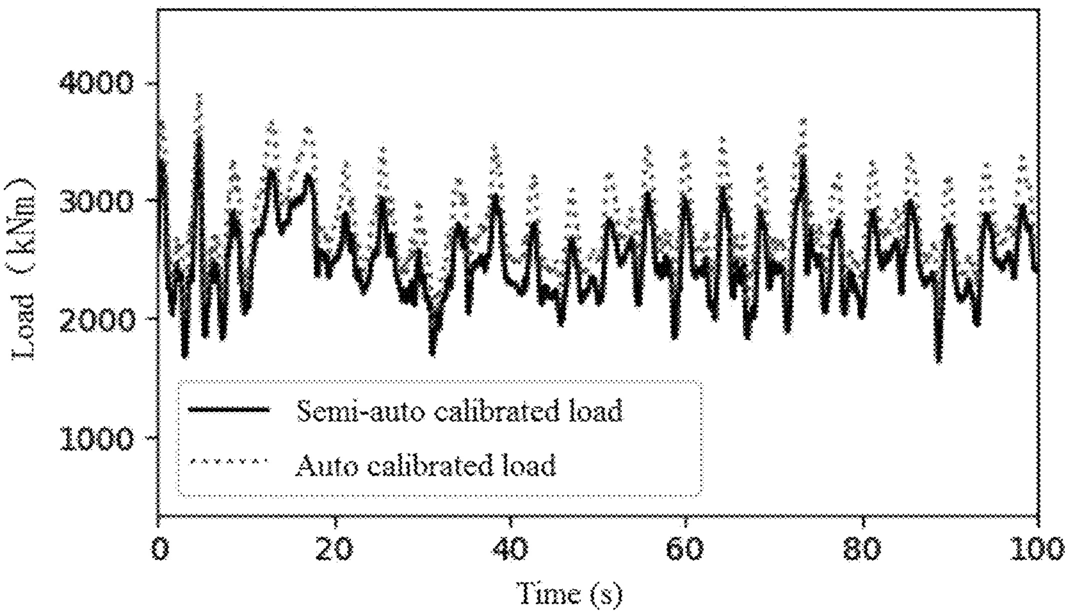
Figure 17C:
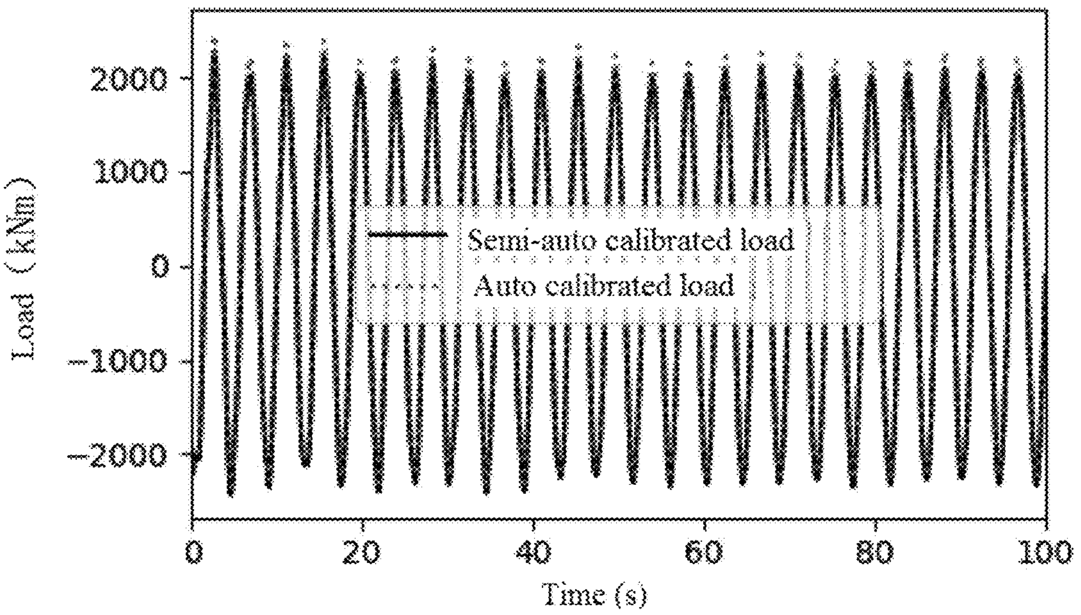
Figure 17D:
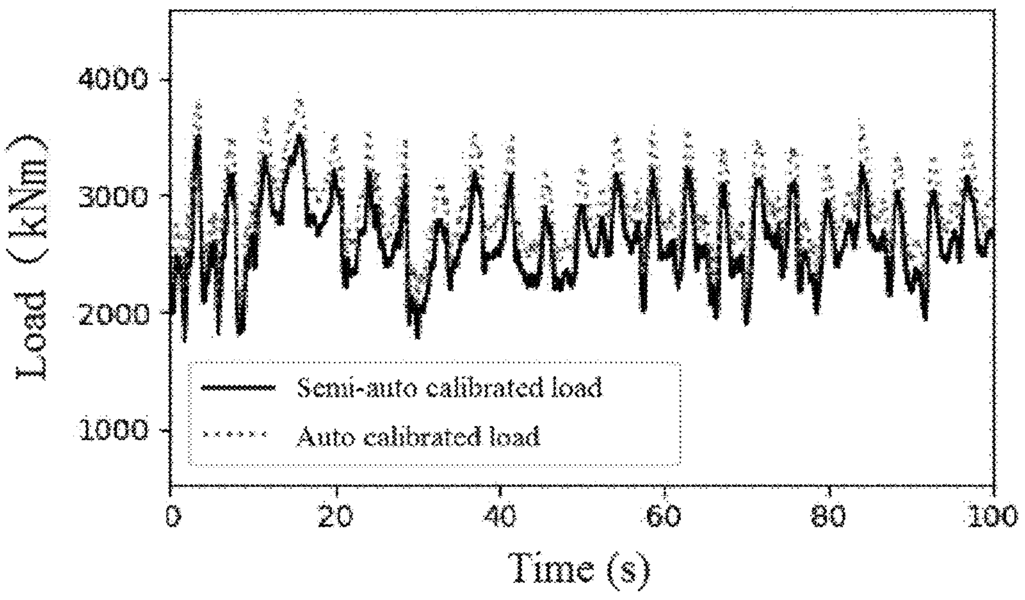
Figure 17E:
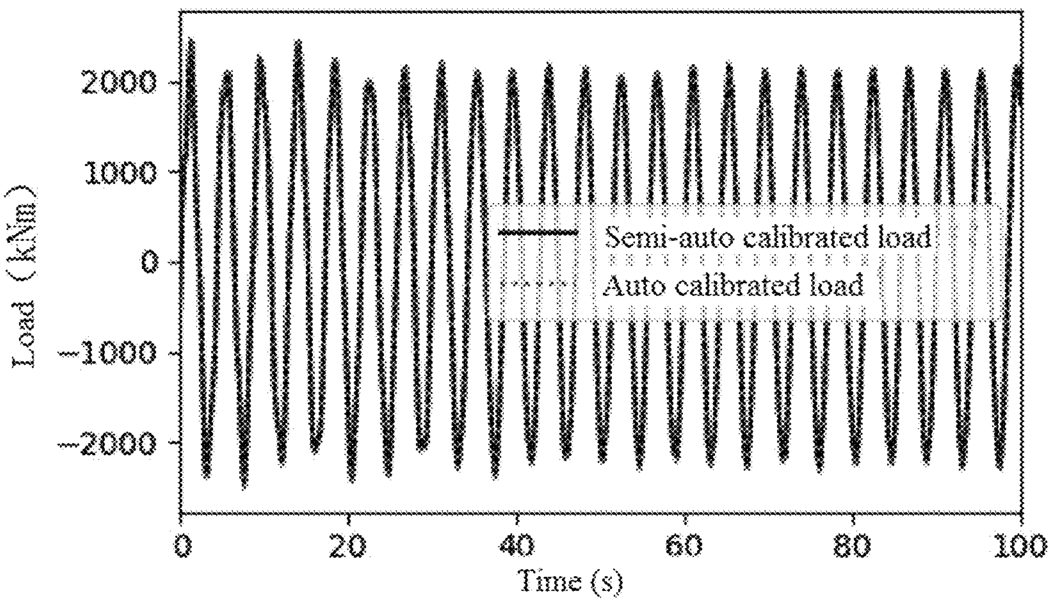
Figure 17F:
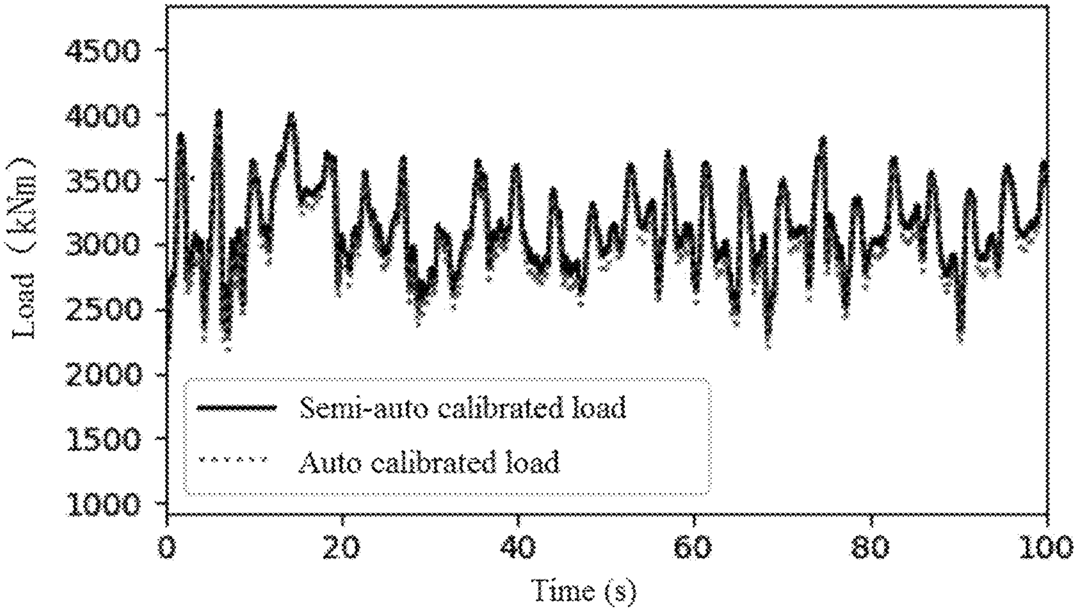

| Blade | Edge | Flap |
|---|---|---|
| 1 | As shown in FIG. 17A | As shown in FIG. 17B |
| 2 | As shown in FIG. 17C | As shown in FIG. 17D |
| 3 | As shown in FIG. 17E | As shown in FIG. 17F |

Comparison of Load Consistency

In addition to mutual verification with a semi-auto calibration result, comparison of consistency of loads on the three blades obtained by each calibration method is an effective criterion for measuring a quality of a calibration result. In the absence of IPC, the loads of the three blades should have high consistency. Table 5 and Table 6 respectively show comparison of comparison of load consistency with the two calibration methods in the edge direction and the flap directions under the light wind condition and the heavy wind condition. It can be seen that: in the edge direction, the loads obtained through the two methods are close to each other and has consistency. In the flap direction, the load for blade 3 obtained from semi-auto calibration is significantly higher than that of the other two blades, and loads of the three blades are significantly different from each other, while the loads obtained from auto calibration has better consistency, having no significant difference among loads under either the light wind condition or the heavy wind condition. Looking back at the comparison of time series of loads in Table 3 and Table 4, it is found that the auto calibrated loads on blade 1 and blade 2 are higher than the semi-auto calibration result in the flap direction, and this deviation effectively corrected for the mutual difference among the three blades.

Based on the above analysis, it can be considered that the auto calibration load is more reasonable and accurate than the semi-auto calibration result.

TABLE 5

Comparison of consistency of loads of a generator set in an edge direction of a wind power plant

Figure 18A:
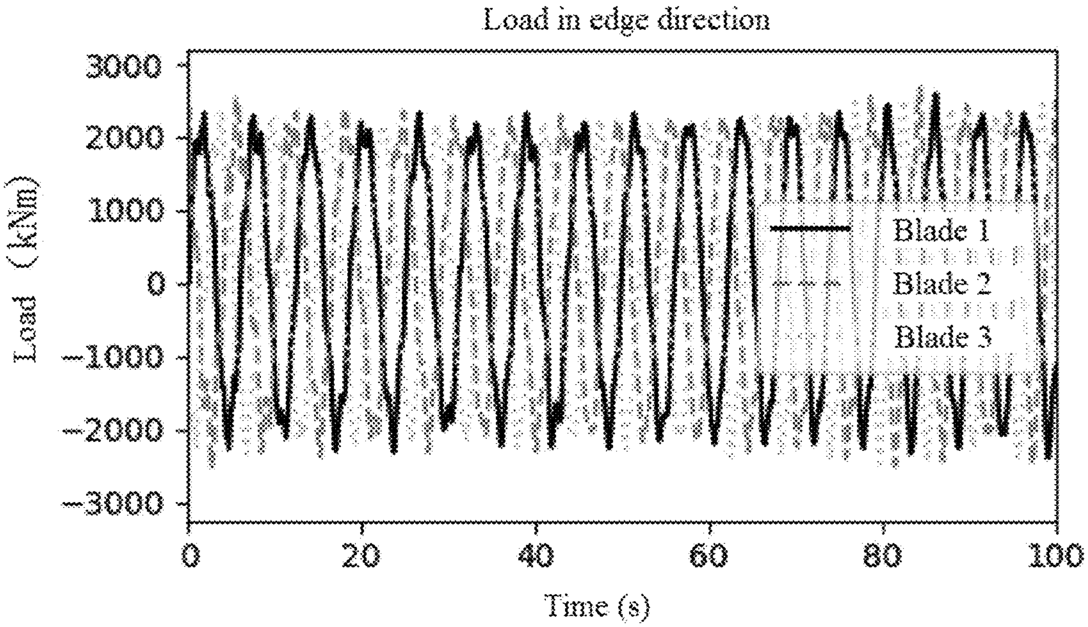
FIGS. 18A to 18D are schematic diagrams illustrating comparison of consistency of loads in an edge direction of a generator set according to an embodiment of the present disclosure.
Figure 18B:
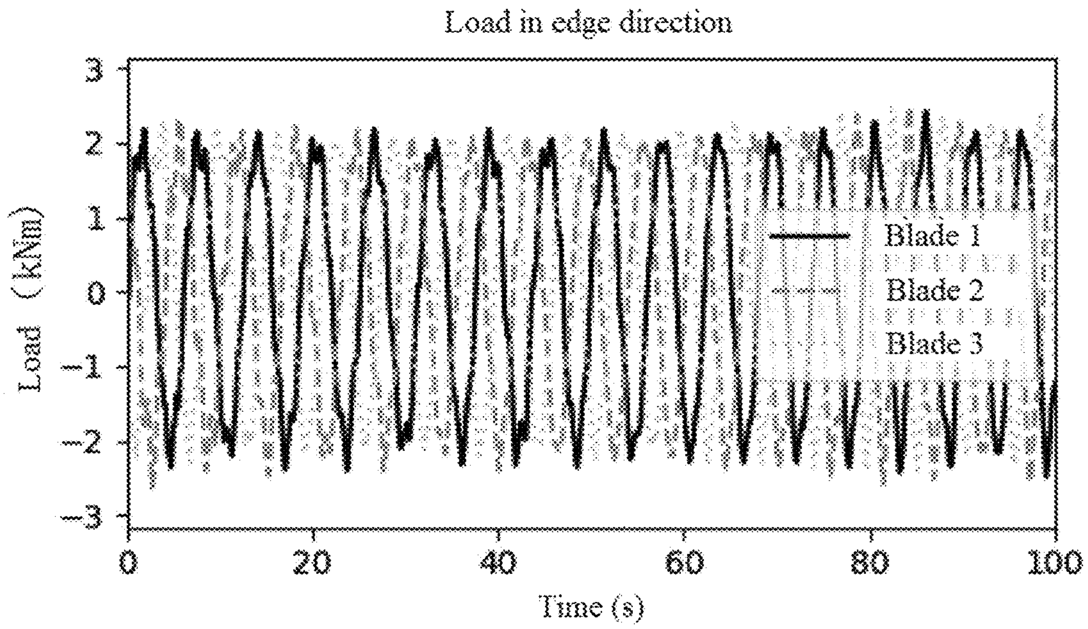
Figure 18C:
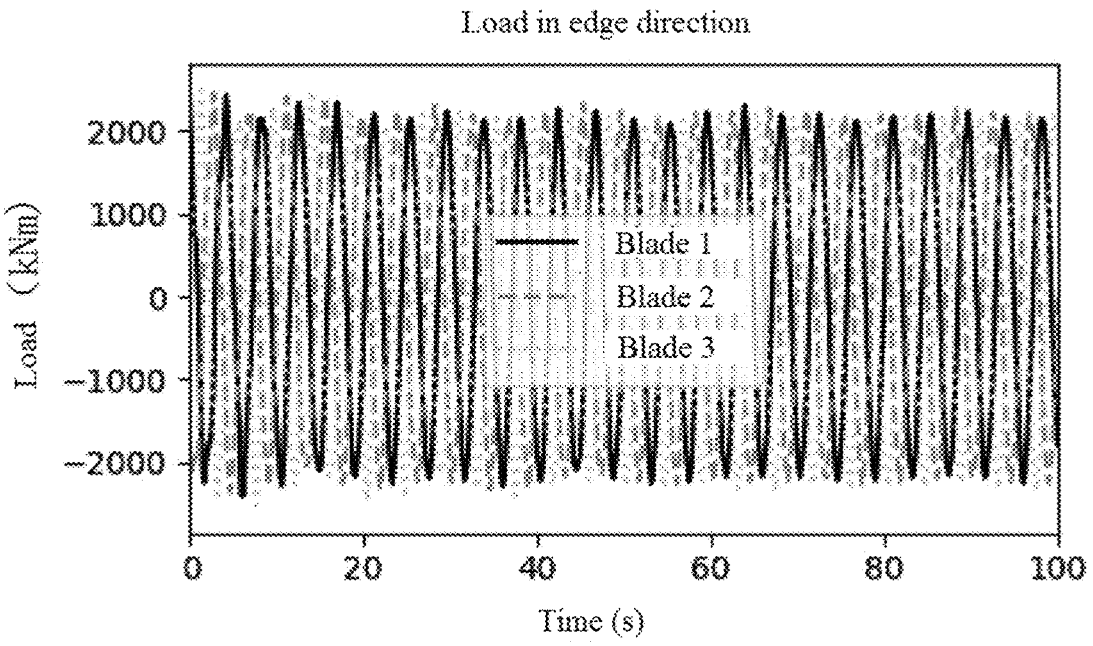
Figure 18D:
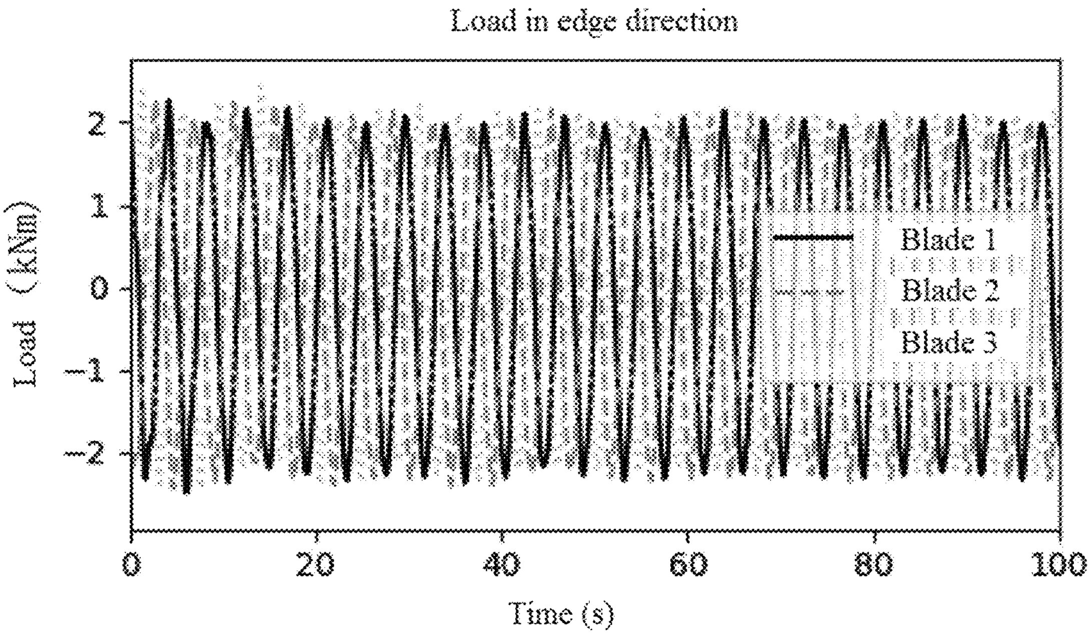

| | Auto calibration | Semi-auto calibration |
|---|---|---|
| Light wind | As shown in FIG. 18A | As shown in FIG. 18B |
| Heavy wind | As shown in FIG. 18C | As shown in FIG. 18D |

TABLE 6

Comparison of consistency of loads of a generator set in a flap direction of a wind power plant

Figure 19A:
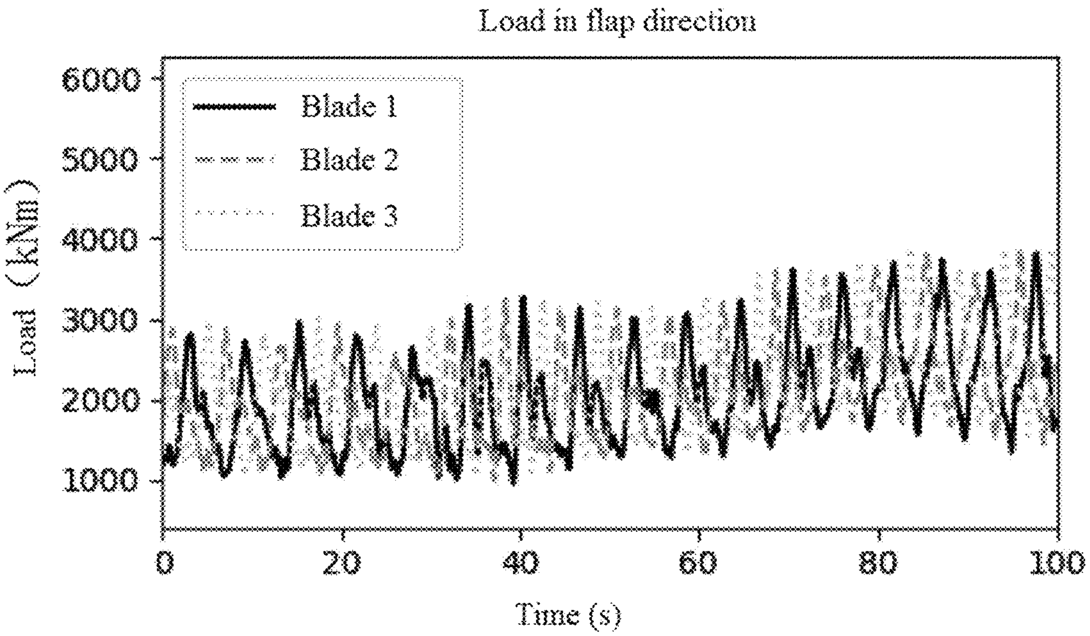
FIGS. 19A to 19D are schematic diagrams illustrating comparison of consistency of loads in a flap direction of a generator set according to an embodiment of the present disclosure.
Figure 19B:
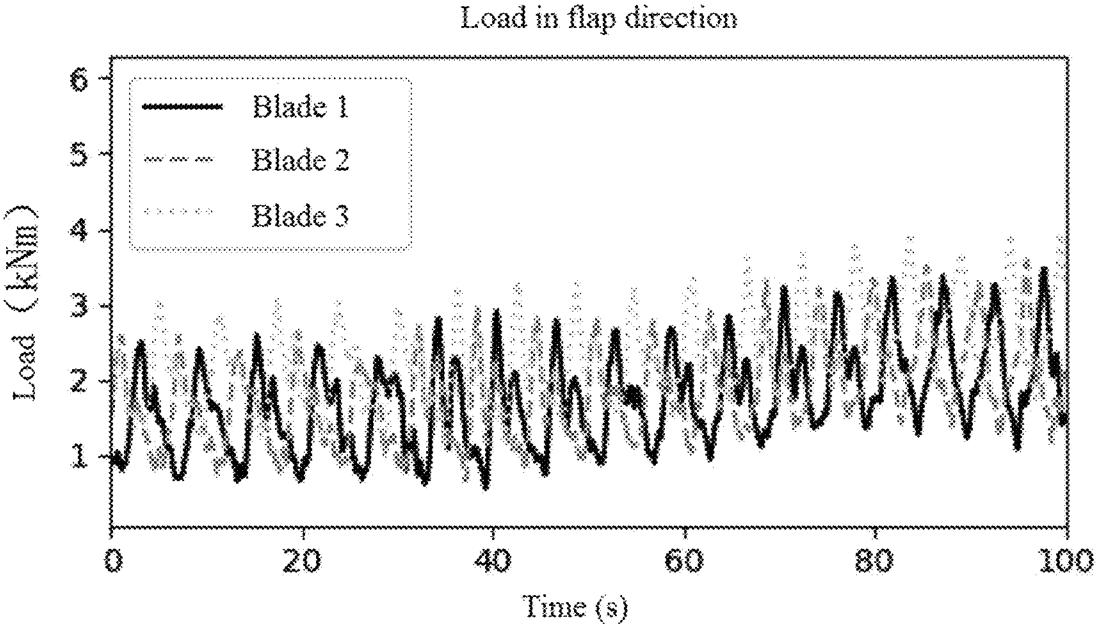
Figure 19C:
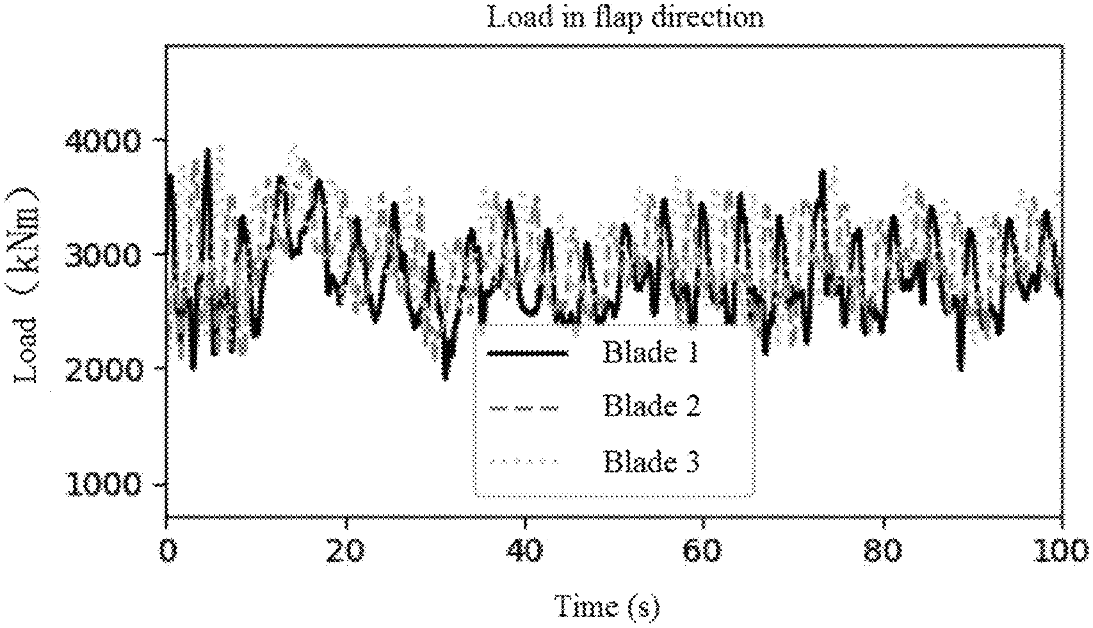
Figure 19D:
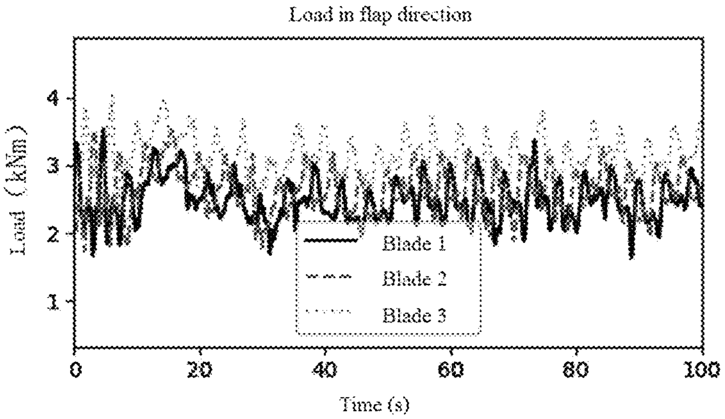

| | Auto calibration | Semi-auto calibration |
|---|---|---|
| Light wind | As shown in FIG. 19A | As shown in FIG. 19B |
| Heavy wind | As shown in FIG. 19C | As shown in FIG. 19D |

In FIG. 18A to FIG. 18D, a horizontal axis represents time and a vertical axis represents load. In FIG. 19A to FIG. 19D, a horizontal axis represents time, a vertical axis represents load, Edge wise refers to a load in the edge direction, Flap wise refers to a load in the flap direction, and blade1, blade2, and blade3 refer to a first blade, a second blade, and a third blade, respectively.

Stability Analysis of Calibration Results

The auto calibration scheme based on normal operation data of a generator set adopts random sampling for generating a training set for calibration. However, a nonlinear optimization algorithm may fall into local optima. To verify a stability of the calibration scheme, the calibration process is repeated 10 times independently.

Figure 20:
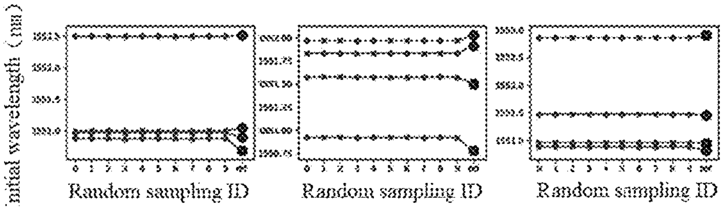
FIG. 20 is a schematic diagram showing a wavelength of a sensor in 10 independent calibrations according to an embodiment of the present disclosure.
Figure 21:
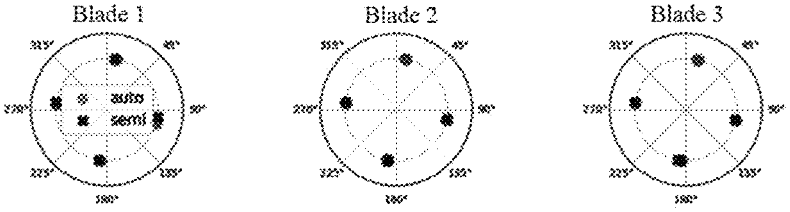
FIG. 21 is a schematic diagram showing an installation position of a sensor in 10 independent calibrations according to an embodiment of the present disclosure.
Figure 22:
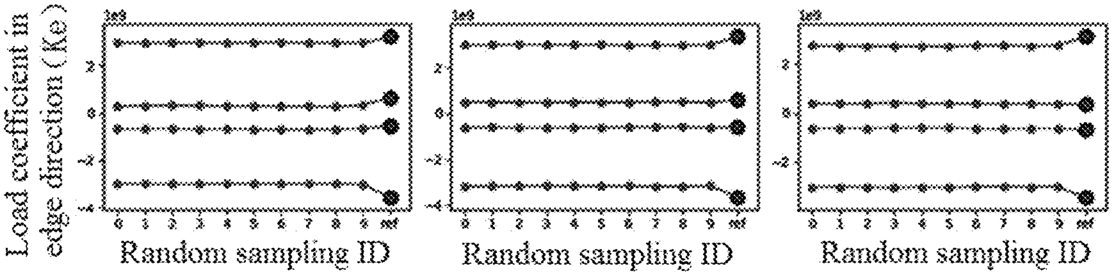
FIG. 22 is a schematic diagram showing a load coefficient in an edge direction in 10 independent calibrations according to an embodiment of the present disclosure.
Figure 23:
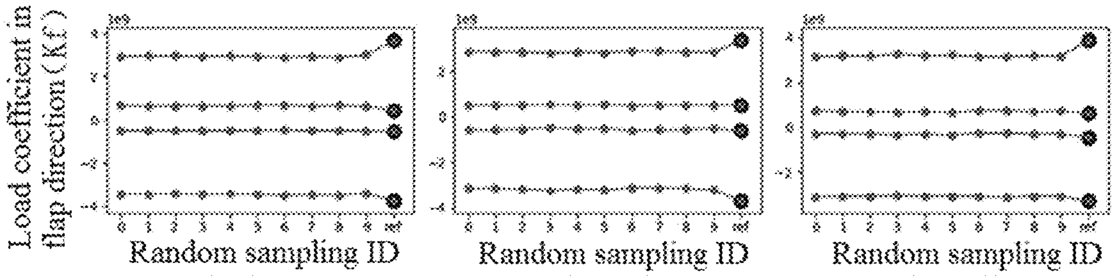
FIG. 23 is a schematic diagram showing a load coefficient in a flap direction in 10 independent calibrations according to an embodiment of the present disclosure.

FIG. 20 to FIG. 23 show sensor parameters obtained from the independent ten calibrations. The parameters include a sensor wavelength, an installation position, a load coefficient in the edge direction, a load coefficient in the flap direction, and a comparison with a semi-auto calibration result. In FIG. 20, a horizontal axis represents a random sampling ID, a vertical axis represents an initial wavelength (fbg0, in a unit of nm). FIG. 21 represents three blades (blade1, blade2, blade3). In FIG. 22, a horizontal axis represents a random sampling ID, a vertical axis represents a load coefficient (Ke) in the edge direction. In FIG. 23, a horizontal axis represents a random sampling ID, and a vertical axis represents a load coefficient ($K_f$) in the flap direction. It can be seen that the auto calibration result shows high stability in all dimensions, consistent with the semi-auto calibration result in terms of trend, with differences in details. FIG. 21 shows that the sensor position obtained from semi-auto calibration show directional deviations on blade 2 and blade 3, while the auto calibration result does not show such problem.

The above comparisons provide the stability and repeatability of the auto calibration result, the consistency with the semi-auto calibration, and the superiority over the semi-auto calibration in some aspects.

(2) Calibration Scheme Based on Idle Data at Two Blade Angles

Figure 24:
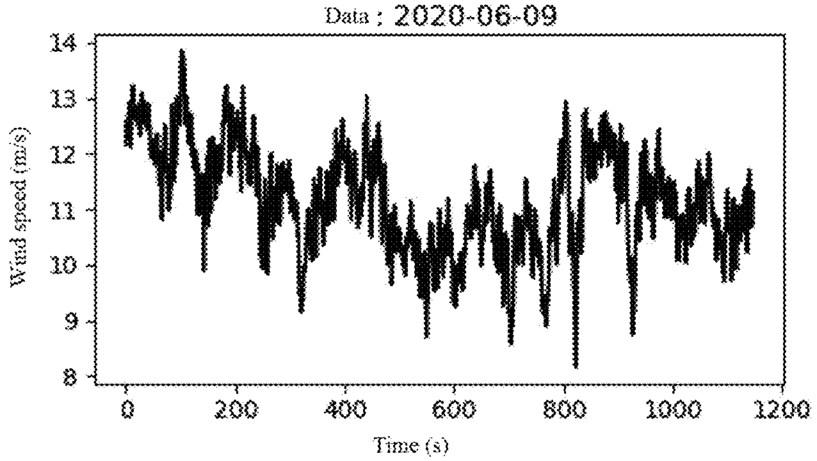
FIG. 24 is a timing diagram of a wind speed in validation data in a power generation condition for calibration of a generator set according to an embodiment of the present disclosure.

Idle data at a 30-degree pitch angle and a 40-degree pitch angle is obtained during verification of idling with semi-auto calibration of a generator set in a wind power plant on April $5^{th}$. The data are merged as the training set for calibration, for auto calibration of a fiber optic load sensor at a blade root. Comparison and analysis on an auto calibration load and a semi-auto calibration load by using data under a power generation condition. FIG. 24 shows a time series of a 3-second average wind speed of power generation data. In FIG. 14, a horizontal axis represents time and a vertical axis represents wind speed. FIG. 24 shows a time series of wind speed of verification data under a power generation condition for calibration of a generator set in a wind power plant.

Under the above verification condition, comparison of time series of root loads of the three blades obtained from auto calibration and semi-auto calibration under the power generation condition is shown in Table 7. In FIG. 25A to FIG. 25F, a horizontal axis represents time, a vertical axis represents load, a solid line represents a semi-auto calibrated load, a dashed line represents an auto calibrated load, Medge of Blade refers to an edge direction of a blade, and Mflap of Blade refers to a flap direction of a blade. As can be seen, the two calibration methods have slight difference in the edge direction or the flip direction, and the calibrated loads are close to each other.

TABLE 7

Comparison of time series of auto calibrated loads under a power generation condition of a generator set in a wind power plant

Figure 25A:
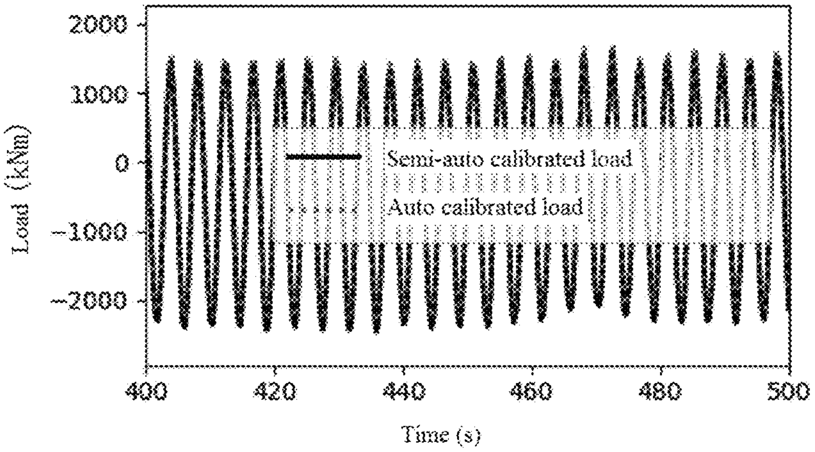
FIGS. 25A to 25F are schematic diagrams illustrating comparison of timings of an auto-calibrated load for a generator set under a power generation condition according to an embodiment of the present disclosure.
Figure 25B:
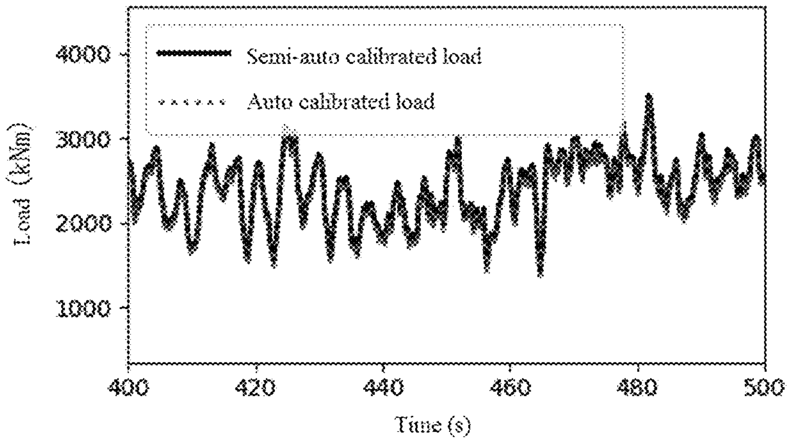
Figure 25C:
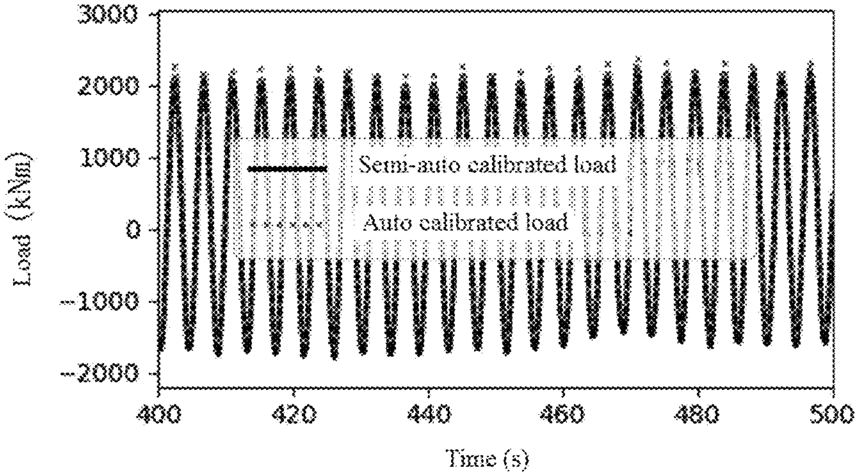
Figure 25D:
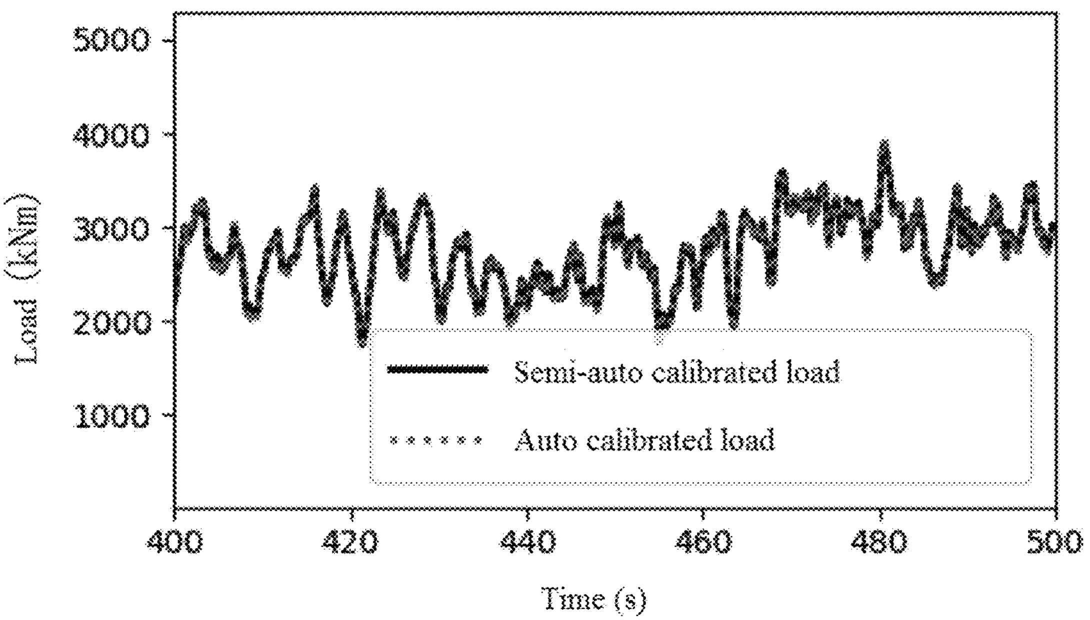
Figure 25E:
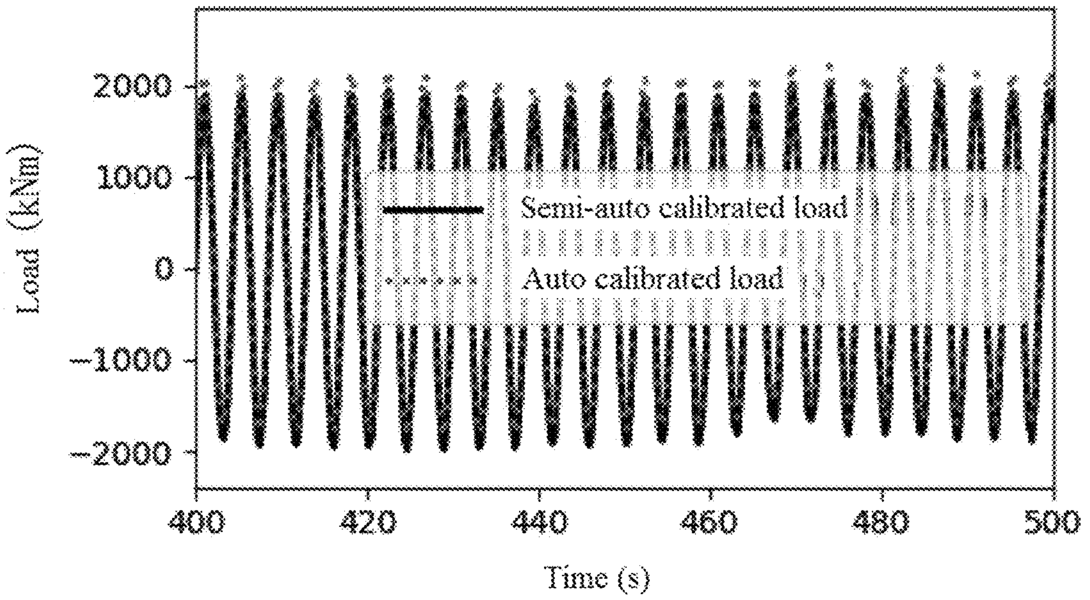
Figure 25F:
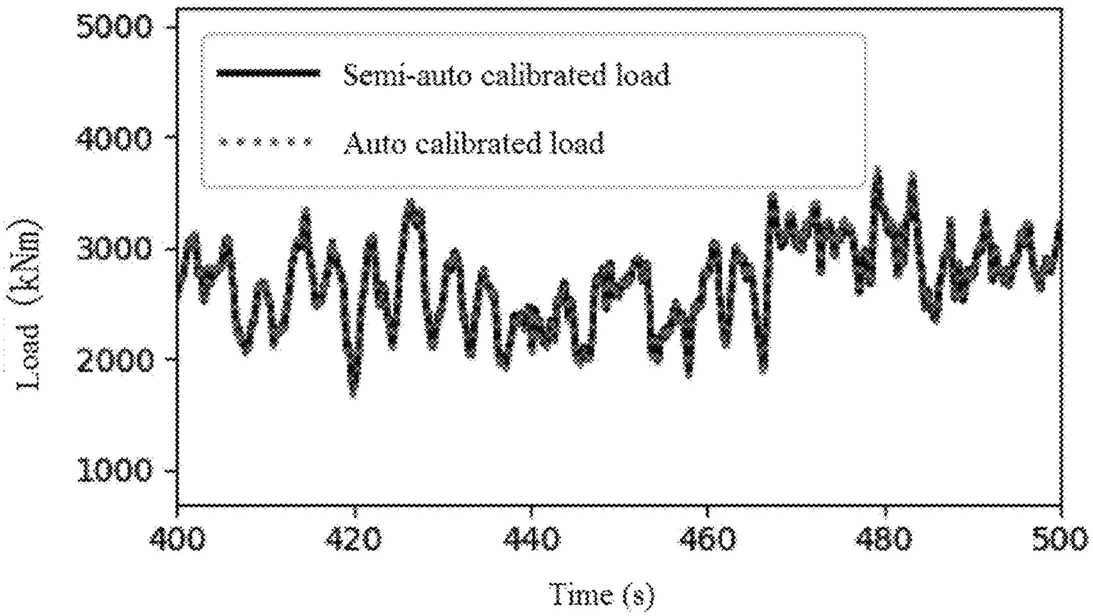

| Blade | Edge | Flap |
|---|---|---|
| 1 | As shown in FIG. 25A | As shown in FIG. 25B |
| 2 | As shown in FIG. 25C | As shown in FIG. 25D |
| 3 | As shown in FIG. 25E | As shown in FIG. 25F |

Although some embodiments of the present disclosure have been illustrated and described, those skilled in the art should understand that modifications can be made to these embodiments without departing from the principles and spirit of the present disclosure, which are defined by the claims and equivalents thereof.

The invention claimed is:

1. A method for calibrating a load sensor, comprising:

measuring, by one or more controllers, a set of operation parameters associated with a wind turbine of a generator set to obtain operation data of the wind turbine, wherein the operation data comprises data of the wind turbine operating in a normal state;

generating, by the one or more controllers, a training set for calibration based on the operation data;

calibrating, by the one or more controllers, the load sensor based on the training set for calibration to obtain an updated sensor parameter;

distributing, by the one or more controllers, the updated sensor parameter to a main controller of the wind turbine of the generator set through wired or wireless data transmission; and applying, by the main controller of the wind turbine, the updated sensor parameter to control or protect the generator set, wherein generating the training set for calibration comprises:

filtering the operation data based on a preset filtering condition to obtain a first dataset;

dividing, based on a pitch angle for each piece of the operation data in the first dataset, the first dataset into a first set for pitch angles at idle and a second set for pitch angles not at idle, wherein the second set comprises one or more pieces of the operation data in the first dataset not having a pitch angle at idle;

performing random sampling on a first subset of the operation data in the first set and a second subset of the operation data in the second set, respectively, to obtain data points, wherein each of the data points comprises a piece of the operation data corresponding to an azimuth angle at a time instant such that the data points are associated with corresponding azimuth angles; and generating the training set for calibration based on the corresponding azimuth angles associated with the data points.

2. The method according to claim 1, wherein performing the random sampling on the first subset of the operation data in the first set and on the second subset of the operation data in the second set, respectively, to obtain the data points, and generating the training set for calibration based on the corresponding azimuth angles associated with the data points comprises:

obtaining the data points from the first set and the second set through the random sampling;

distributing the data points into corresponding azimuth bins, based on the corresponding azimuth angles associated with the data points, until a quantity of the data points in each of the azimuth bins reaches a predetermined value; and merging the data points from all the azimuth bins to generate the training set for calibration.

3. The method according to claim 2, wherein:

each of the azimuth bins is a storage area corresponding to an angle interval of angle intervals determined by evenly dividing 360 degrees, wherein each azimuth bin covers a first predetermined angle; and each angle interval corresponds to two azimuth bins, wherein the two azimuth bins correspond to the first set and the second set, respectively.

4. The method according to claim 1, wherein:

measuring the set of operation parameters to obtain the operation data of the wind turbine comprises:

measuring the set of operation parameters to obtain the operation data of the wind turbine at equal intervals within a predetermined time period as datasets; and filtering the operation data based on the preset filtering condition comprises:

filtering, based on the preset filtering condition, each of the datasets obtained at the equal intervals to obtain the first dataset.

5. The method according to claim 1, wherein measuring the set of operation parameters to obtain the operation data of the wind turbine comprises:

measuring the set of operation parameters to obtain the operation data of the wind turbine continuously within a predetermined time period; or measuring the set of operation parameters to obtain the operation data of the wind turbine at equal intervals within the predetermined time period.

6. The method according to claim 1, wherein the calibrating the load sensor based on the training set for calibration comprises:

obtaining, based on the training set for calibration, an actual strain of a load for the load sensor; and calibrating the load sensor based on a theoretical strain, the actual strain and a minimized loss function, wherein the theoretical strain refers to a theoretical measurement of a strain due to the load.

7. The method according to claim 1, wherein the one or more controllers comprise at least one of a standalone controller or a field-level controller.

8. A device for calibrating a load sensor, comprising:

a memory storing instructions, and a processor, wherein the processor, when executing the instructions, is configured to:

measure a set of operation parameters associated with a wind turbine of a generator set to obtain operation data of the wind turbine, wherein the operation data comprises data of the wind turbine operating in a normal state;

generate, based on the operation data, a training set for calibration;

calibrate the load sensor based on the training set for calibration to obtain an updated sensor parameter; and distribute the updated sensor parameter to a main controller of the wind turbine of the generator set through wired or wireless data transmission, wherein the main controller of the wind turbine applies the updated sensor parameter to control or protect the generator set, and wherein to generate the training set for calibration, the processor is further configured to:

filter the operation data based on a preset filtering condition to obtain a first dataset;

divide, based on a pitch angle for each piece of the operation data in the first dataset, the first dataset into a first set for pitch angles at idle and a second set for pitch angles not at idle, wherein the second set comprises one or more pieces of the operation data in the first dataset not having a pitch angle at idle;

perform random sampling on a first subset of the operation data in the first set and a second subset of the operation data in the second set, respectively, to obtain data points, wherein each of the data points comprises a piece of the operation data corresponding to an azimuth angle at a time instant such that the data points are associated with corresponding azimuth angles; and generate the training set for calibration based on the corresponding azimuth angles associated with the data points.

9. The device according to claim 8, wherein the processor is further configured to:

obtain the data points from the first set and the second set through the random sampling;

distribute the data points into corresponding azimuth bins, based on the corresponding azimuth angles associated with the data points, until a quantity of the data points in each of the azimuth bins reaches a predetermined value; and merge the data points from all the azimuth bins to generate the training set for calibration.

10. The device according to claim 9, wherein:

each of the azimuth bins is a storage area corresponding to an angle interval of angle intervals determined by evenly dividing 360 degrees, wherein each azimuth bin covers a first predetermined angle; and each angle interval corresponds to two azimuth bins, wherein the two azimuth bins correspond to the first set and the second set, respectively.

11. The device according to claim 8, wherein the processor is further configured to:

measure the set of operation parameters to obtain the operation data of the wind turbine at equal intervals within a predetermined time period as datasets; and filter, based on the preset filtering condition, each of the datasets obtained at the equal intervals to obtain the first dataset.

12. The device according to claim 8, wherein the processor is further configured to:

obtain, based on the training set for calibration, an actual strain of a load for the load sensor; and calibrate the load sensor based on a theoretical strain, the actual strain and a minimized loss function, wherein the theoretical strain refers to a theoretical measurement of a strain due to the load.

13. A non-transitory computer-readable storage medium storing instructions, wherein the instructions, when executed by at least one computing device, cause the computing device to perform a method comprising:

measuring a set of operation parameters associated with a wind turbine of a generator set to obtain operation data of the wind turbine, wherein the operation data comprises data of the wind turbine operating in a normal state;

generating, based on the operation data, a training set for calibration;

calibrating the load sensor based on the training set for calibration to obtain an updated sensor parameter; and distributing, by the one or more controllers, the updated sensor parameter to a main controller of the wind turbine of the generator set through wired or wireless data transmission, wherein the main controller of the wind turbine applies the updated sensor parameter to control or protect the generator set, and wherein generating the training set for calibration comprises:

filtering the operation data based on a preset filtering condition to obtain a first dataset;

dividing, based on a pitch angle for each piece of the operation data in the first dataset, the first dataset into a first set for pitch angles at idle and a second set for pitch angles not at idle, wherein the second set comprises one or more pieces of the operation data in the first dataset not having a pitch angle at idle;

performing random sampling on a first subset of the operation data in the first set and a second subset of the operation data in the second set, respectively, to obtain data points, wherein each of the data points comprises a piece of the operation data corresponding to an azimuth angle at a time instant such that the data points are associated with corresponding azimuth angles; and generating the training set for calibration based on the corresponding azimuth angles associated with the data points.

14. The computer-readable storage medium according to claim 13, wherein performing the random sampling on the first subset of the operation data in the first set and on the second subset of the operation data in the second set, respectively, to obtain the data points, and generating the training set for calibration based on the azimuth angles in the data points comprises:

obtaining the data points from the first set and the second set through the random sampling;

distributing the data points into corresponding azimuth bins, based on the corresponding azimuth angles associated with the data points, until a quantity of the data points in each of the azimuth bins reaches a predetermined value; and merging the data points from all the azimuth bins to generate the training set for calibration.

15. The computer-readable storage medium according to claim 14, wherein:

each of the azimuth bins is a storage area corresponding to an angle interval of angle intervals determined by evenly dividing 360 degrees, wherein each azimuth bin covers a first predetermined angle; and each angle interval corresponds to two azimuth bins, wherein the two azimuth bins correspond to the first set and the second set, respectively.

16. The computer-readable storage medium according to claim 13, wherein:

measuring the set of operation parameters to obtain the operation data of the wind turbine comprises:

measuring the set of operation parameters to obtain the operation data of the wind turbine at equal intervals within a predetermined time period as datasets; and filtering the operation data based on the preset filtering condition comprises:

filtering, based on the preset filtering condition, each of the datasets obtained at the equal intervals to obtain the first dataset.

17. The computer-readable storage medium according to claim 13, wherein measuring the set of operation parameters to obtain the operation data of the wind turbine comprises:

measuring the set of operation parameters to obtain the operation data of the wind turbine continuously within a predetermined time period; or measuring the set of operation parameters to obtain the operation data of the wind turbine at equal intervals within the predetermined time period.

18. The computer-readable storage medium according to claim 13, wherein the calibrating the load sensor based on the training set for calibration comprises:

obtaining, based on the training set for calibration, an actual strain of a load for the load sensor; and calibrating the load sensor based on a theoretical strain, the actual strain and a minimized loss function, wherein the theoretical strain refers to a theoretical measurement of a strain due to the load.

* * * * *